US010521407B2

(12) United States Patent
Dubost et al.

(10) Patent No.: US 10,521,407 B2
(45) Date of Patent: Dec. 31, 2019

(54) GROUPING OF DATABASE OBJECTS

(71) Applicant: CA, Inc., New York, NY (US)

(72) Inventors: Philippe Dubost, Prague (CZ); Shweta Tiwari, Vadodara (IN); Brian Hughes, Round Hill, VA (US); Preetdeep Kumar, Telangana (IN)

(73) Assignee: CA, Inc., New York, NY (US)

(*) Notice: Subject to any disclaimer, the term of this patent is extended or adjusted under 35 U.S.C. 154(b) by 674 days.

(21) Appl. No.: 14/673,957

(22) Filed: Mar. 31, 2015

(65) Prior Publication Data

US 2016/0283584 A1    Sep. 29, 2016

Related U.S. Application Data

(63) Continuation of application No. 14/699,081, filed on Mar. 26, 2015, now Pat. No. 10,089,334.

(51) Int. Cl.
| | |
|---|---|
| *G06F 15/16* | (2006.01) |
| *G06F 16/21* | (2019.01) |
| *G06F 16/35* | (2019.01) |
| *G06F 16/28* | (2019.01) |
| *G06F 16/23* | (2019.01) |
| *G06F 16/9535* | (2019.01) |

(52) U.S. Cl.
CPC ............ *G06F 16/217* (2019.01); *G06F 16/21* (2019.01); *G06F 16/2322* (2019.01); *G06F 16/285* (2019.01); *G06F 16/35* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 8,977,620 | B1 | 3/2015 | Buryak et al. |
| 2004/0030703 | A1 | 2/2004 | Bourbonnais et al. |
| 2006/0036618 | A1* | 2/2006 | Shuma ............... G06F 17/30339 |
| 2006/0248057 | A1 | 11/2006 | Jacobs et al. |
| 2007/0011195 | A1 | 1/2007 | Kutsumi et al. |
| 2009/0271448 | A1 | 10/2009 | Chen et al. |
| 2012/0278331 | A1* | 11/2012 | Campbell ............. G06F 16/437 |
| | | | 707/740 |
| 2013/0066855 | A1* | 3/2013 | Gupta ............... G06F 17/30477 |
| | | | 707/722 |

(Continued)

*Primary Examiner* — Alex Gofman
(74) *Attorney, Agent, or Firm* — Kowert, Hood, Munyon, Rankin & Goetzel, P.C.

(57) ABSTRACT

A computing device analyzes the transaction entries in a transaction log to identify related commands associated with performing a set of data operations. Commands are considered to be potentially related if the commands are executed within a predetermined timespan. Sets of potentially related commands are then grouped together into corresponding candidate patterns, and further analyzed in view of additional information to determine a probability that the potentially related commands of a candidate pattern are actually related. A confidence value indicating that probability is also determined. Application management tasks, such as database optimization and recovery tasks, for example, may then be performed based on the candidate patterns that meet or exceed a predetermined threshold.

18 Claims, 14 Drawing Sheets

(56) References Cited

U.S. PATENT DOCUMENTS

2013/0066944 A1* 3/2013 Laredo ................. G06Q 50/01
709/203
2013/0097167 A1* 4/2013 St. Jacques, Jr. ...........................
G06F 17/30011
707/737
2014/0100975 A1 4/2014 Van

* cited by examiner

FIG. 3

| TIMESTAMP | APPLICATION ID | USER ID | SQL QUERY EXECUTED |
|---|---|---|---|
| 08:01:25:252 | PGM1 | USER1 | UPDATE TABLE1 SET COLUMN1 = X WHERE COLUMN2 = X |
| 08:01:25:269 | PGM1 | USER1 | SELECT * FROM TABLE2 |
| 08:01:26:298 | PGM1 | USER1 | UPDATE TABLE3 SET COLUMN4 = X WHERE COLUMN3 = X |
| 08:01:27:123 | PGM1 | USER2 | UPDATE TABLE3 SET COLUMN4 = X WHERE COLUMN3 = X |
| 08:01:28:985 | PGM1 | USER2 | UPDATE TABLE1 SET COLUMN1 = X WHERE COLUMN2 = X |
| 08:01:28:989 | PGM1 | USER2 | SELECT * FROM TABLE2 |
| 08:01:29:002 | PGM2 | USER3 | DELETE FROM TABLE5 WHERE COLUMN2 = X |
| 08:01:29:568 | PGM2 | USER4 | DELETE FROM TABLE6 WHERE COLUMN7 = X |
| 08:01:29:635 | PGM3 | USER4 | SELECT * FROM TABLE 3 |
| 08:01:29:640 | PGM1 | USER4 | INSERT INTO TABLE 5 VALUES (x,x,x) |
| 08:01:29:888 | PGM8 | USER8 | UPDATE TABLE3 SET COLUMN4 = X WHERE COLUMN3 = X |
| 08:01:29:901 | PGM2 | USER4 | UPDATE TABLE4 SET COLUMN7 = X WHERE COLUMN3 = X |
| 08:01:29:995 | PGM2 | USER5 | DELETE FROM TABLE5 WHERE COLUMN2 = X |
| 08:01:29:996 | PGM1 | USER1 | UPDATE TABLE1 SET COLUMN1 = X WHERE COLUMN2 = X |
| 08:01:29:998 | PGM1 | USER5 | SELECT * FROM TABLE2 |
| 08:01:30:000 | PGM2 | USER5 | DELETE FROM TABLE6 WHERE COLUMN7 = X |
| 08:01:30:254 | PGM3 | USER5 | SELECT * FROM TABLE3 |
| 08:01:30:259 | N/A | USER7 | SELECT * FROM TABLE7 |
| 08:01:30:269 | PGM1 | USER4 | INSERT INTO TABLE8 VALUES (x,x,x,x,x) |
| 08:01:30:368 | N/A | USER7 | SELECT * FROM TABLE7 |
| 08:01:30:852 | PGM5 | USER9 | INSERT INTO TABLE9 VALUES (x,x,x,x,x) |
| 08:01:30:856 | PGM5 | USER9 | UPDATE TABLE7 SET COLUMN6 = Y WHERE COLUMN1 = X |
| 08:01:30:860 | PGM5 | USER9 | UPDATE TABLE8 SET COLUMN6 = Y WHERE COLUMN81 = X |
| 08:01:31:000 | PGM5 | USER9 | UPDATE TABLE15 SET COLUMN15 = Y WHERE COLUMN151 = X |
| 08:01:31:856 | PGM5 | USER9 | SELECT FROM TABLE12 SET COLUMN2 = Y WHERE COLUMN121 = X |
| 08:01:31:890 | PGM5 | USER9 | UPDATE TABLE10 SET COLUMN6 = Y WHERE COLUMN1 = X |

| PATTERN ID | #OCCURRENCES | %OCCURRENCES | USER-ID CONFIDENCE | PGM-NAME CONFIDENCE | OVERALL CONFIDENCE |
|---|---|---|---|---|---|
| PATTERN 1 | 5000 | 50% | 50% | 50% | 75% |
| PATTERN 2 | 3000 | 30% | 100% | 100% | 60% |
| PATTERN 3 | 1800 | 18% | 0% | 0% | 20% |
| PATTERN 4 | 200 | 2% | 100% | 100% | 90% |

GROUPING OF DATABASE OBJECTS

RELATED APPLICATIONS

The present application is a continuation of U.S. patent application Ser. No. 14/669,081, which was filed on Mar. 26, 2015, and which is incorporated by reference herein in its entirety.

BACKGROUND

The present disclosure relates to computing devices, and more particularly, to computing devices configured to analyze existing database configurations and usage and perform tasks based on that usage.

Large corporations generally store and manipulate huge amounts of data using various database systems. Some of the more well-known database systems include DB2, IMS, Datacom, IDMS, MySQL, and Oracle. These database systems usually include objects (e.g., tables, indices, etc.) that store and organize the data, and users with which can interact via one or more application programs. To facilitate database operations, companies task special users, commonly referred to as Database Administrators (DBAs), with managing the database system. However, DBAs face many challenges in the performance of their jobs. One challenge, for example, is trying to understand which applications are interacting which database objects.

While there are many different reasons for such challenges, one such reason is developer turnaround. Particularly, when different application developers implement various requirements to improve a given business application, they may not employ the same techniques to interface with the database. For example, some developers may write code expecting that the database system handle Referential Integrity (RI) according to an internal set of rules. Other developers, however, might implement RI in the program code itself. Such inconsistencies can be problematic for both the database system and the applications that interact with the data.

Another reason is that obsolete source code is sometimes difficult to change. By way of example, when code changes to an application program are needed, any functionality provided by the new or updated code must be "backwards compliant." However, this tends to create "spaghetti" code, which is undesirable from a developer point of view. Further, such code changes can complicate tracking which Standard Query Language (SQL) commands are invoked by which application when performing a desired data operation. These problems may be further compounded by the difficulties that different team members (e.g., the database management team and the application development team) have in communicating with one another.

BRIEF SUMMARY

The present disclosure provides a method, an apparatus, and a corresponding computer-readable storage medium for monitoring and analyzing the configuration and usage of a database, and for performing database management tasks based on that configuration and usage.

In one embodiment of the present disclosure, a computer-implemented method comprises a processing circuit obtaining a transaction log generated by an application program executing on a computing device. The transaction log comprises a plurality of transaction commands executed by the application program. The method also comprises the processing circuit converting the plurality of transaction commands into a set of candidate command patterns. Each candidate command pattern comprises a set of transaction commands that were executed by the application program within a predetermined timespan. The method then comprises the processing circuit determining a confidence value for each candidate command pattern, wherein the confidence value indicates a probability that the set of transaction commands comprising the candidate command pattern relate to a given task, and then generating command pattern data based on the candidate command patterns that meet a predetermined criteria. The command pattern data comprises information for performing an application management task.

In another embodiment, the present disclosure also provides a computing device comprising a communications interface circuit and a processing circuit. The communications interface circuit is configured to obtain a transaction log generated by an application program, in which the transaction log comprises a plurality of commands executed by the application program. The processing circuit is configured to convert the plurality of transaction commands into a set of candidate command patterns, in which each candidate command pattern comprises a set of transaction commands that were executed by the application program within a predetermined timespan, determine a confidence value for each candidate command pattern, wherein the confidence value indicates a probability that the set of transaction commands comprising the candidate command pattern relate to a given task, and generate command pattern data based on the candidate command patterns that meet a predetermined criteria. The command pattern data comprises information for performing an application management task.

In another embodiment, the present invention also provides a computer-readable storage medium configured to store computer program code that, when executed by a processing circuit of a computing device, configures the processing circuit to obtain a transaction log generated by an application program, wherein the transaction log comprises a plurality of commands executed by the application program, convert the plurality of transaction commands into a set of candidate command patterns, in which each candidate command pattern comprises a set of transaction commands that were executed by the application program within a predetermined timespan, determine a confidence value for each candidate command pattern, wherein the confidence value indicates a probability that the set of transaction commands comprising the candidate command pattern relate to a given task, and generate command pattern data based on the candidate command patterns that meet a predetermined criteria. The command pattern data comprises information for performing an application management task.

In some cases, time delays in a system could make it difficult to locate patterns. For example, there may be patterns of commands that exist in a transaction log that are spread out over a time period that is longer than the predetermined timespan. However, the present disclosure is also configured to locate these patterns as well.

Particularly, in one embodiment, the present disclosure provides a computer-implemented method comprising obtaining, by a processing circuit, a set of candidate patterns. Each candidate pattern comprises a set of transaction commands executed by an application program within a first predetermined timespan. Additionally, the method further comprises converting, by the processing circuit, the set of candidate patterns into a set of user patterns. Each user pattern comprises a recurrent series of candidate patterns occurring within a second predetermined timespan. The method further comprises determining, by the processing circuit, a confidence value for each user pattern, wherein the confidence value indicates a probability that the recurrent series of candidate patterns comprising the user pattern relate to a given task, and generating command pattern data based the user patterns that meet a predetermined criteria. The command pattern data comprises information for performing an application management task.

In another embodiment, the present disclosure provides a computing device comprising a communications interface circuit and a processing circuit. The communications interface circuit is configured to obtain a set of candidate patterns from a memory circuit, in which each candidate pattern comprises a set of transaction commands executed by an application program within a first predetermined timespan. The processing circuit is configured to convert the set of candidate patterns into a set of user patterns, in which each user pattern comprises a recurrent series of candidate patterns occurring within a second predetermined timespan, convert a confidence value for each user pattern, wherein the confidence value indicates a probability that the recurrent series of candidate patterns comprising the user pattern relate to a given task, and generate command pattern data based the user patterns that meet a predetermined criteria. The command pattern data comprises information for performing an application management task.

In another embodiment, the present disclosure provides a computer-readable storage medium comprising computer program code stored thereon. When executed by a processing circuit of a computing device, the computer program code configures the processing circuit to obtain a set of candidate patterns from a memory circuit, each candidate pattern comprising a set of transaction commands executed by an application program within a first predetermined timespan, convert the set of candidate patterns into a set of user patterns, each user pattern comprising a recurrent series of candidate patterns occurring within a second predetermined timespan, determine a confidence value for each user pattern, wherein the confidence value indicates a probability that the recurrent series of candidate patterns comprising the user pattern relate to a given task, and generate command pattern data based on the user patterns that meet a predetermined criteria. The command pattern data comprises information for performing an application management task.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

FIG. 3 is a table illustrating a portion of a transaction log that is processed according to one embodiment of the present disclosure.

DETAILED DESCRIPTION

Figure 1:
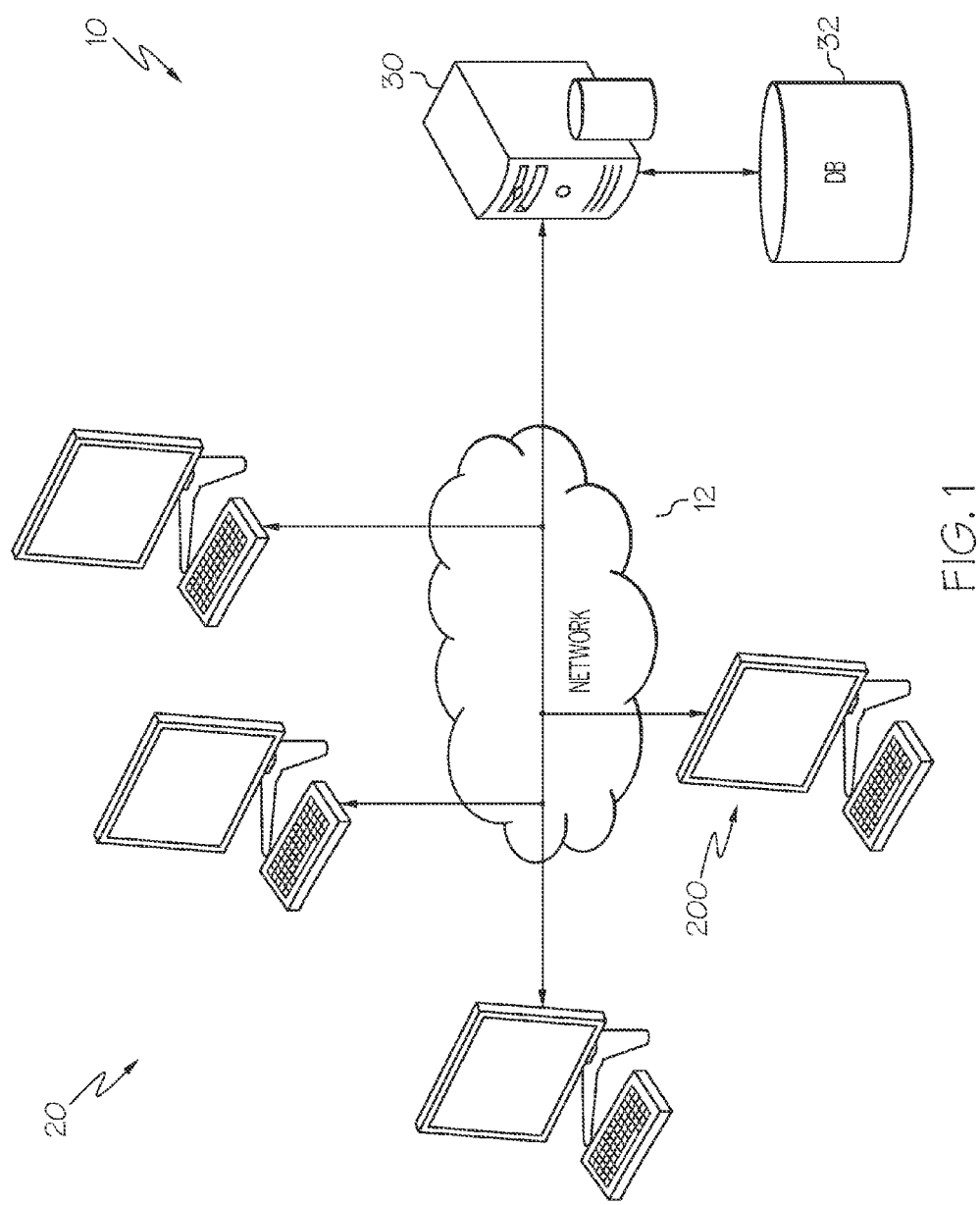
FIG. 1 is a block diagram illustrating some components of a computer network configured according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a system and computer-implemented method for mining data in the transaction logs of a database application, and for locating and identifying different "patterns" of command statements (e.g., Standard Query Language (SQL) command statements). "Patterns" of command statements comprise one or more commands that are executed by a computing device, such as an application server (AS), for example, to perform a given database function and/or operation. Generally, each command that is executed by the computing device has a corresponding transaction entry in a transaction log file.

To identify the patterns, embodiments of the present disclosure analyze the transaction entries in the transaction log in light of various "clues" or "indicators" that help determine whether the commands in the transaction entries are related. Such clues may include, but are not limited to, an indication that a particular SQL command was executed in concert with one or more other related SQL commands within a predetermined timespan in the performance of a given database function or task, the presence of particular SQL command(s) or text within such commands, the identity of a specific user, localhost, batch job, or application program that issued the commands, the identities of one or more stored procedures related to the execution of the SQL commands, the existence and/or content of a given internal RI, and the like.

Upon identifying such patterns, the present disclosure generates information that enables the performance of a management task. The information may be based on whichever patterns meet or exceed a predetermined criteria. For example, some embodiments of the present disclosure output information associated with the patterns (e.g., some or all of the command structure, the target data objects they operate on, a timestamp, etc.) in a formatted printed report or to a display device. Database Administrators (DBAs) and other such personnel can then use this information to identify certain SQL commands and their target data objects (e.g., data tables, indices, etc.), and to better perform such administrative functions as optimizing the database capacity and performance, and planning for backup and/or recovery operations. Additionally, or alternatively, embodiments of the present disclosure may output a report that recommends or suggests various functions and/or optimizations for the DBA to perform based on the analysis of the identified patterns. Regardless of how the information that is determined from the analysis of the patterns, however, the method of the present disclosure helps such personnel to manage the database more efficiently.

Turning now to the drawings, FIG. 1 is a functional block diagram illustrating a communications system 10 configured according to one embodiment of the present disclosure. Those of ordinary skill in the art will readily appreciate that FIG. 1 illustrates only some of the components that can comprise such a system 10, and that other components not specifically shown herein may or may not be present. Additionally, it should be noted that the present embodiments are described in the context of mining SQL commands and their related data objects to identify various patterns. However, the specific mention of SQL is for illustrative purposes only. The present embodiments may be utilized to identify patterns of commands in other statements as well, regardless of whether the logs associated with the execution of the commands do, or do not, include SQL statements. Thus, the embodiments of the present disclosure may also be utilized to analyze log files associated with non-SQL related applications.

As seen in FIG. 1, system 10 comprises an IP network 12 that communicatively interconnects a plurality of user terminals 20 and a control computer 200 with a database (DB) server 30. In addition, the DB server 30 communicatively connects to a data storage device 32. Generally, the user terminals 20 communicate with DB server 30 to store data to, and retrieve data from, storage device 32 in a series of transactions. The control computer 200, as will be described in more detail later, is configured to analyze the information that is stored in association with these transactions, determine patterns of commands within this information, and to generate command pattern data based on the candidate command patterns that meet a predetermined criteria. Thus, control computer 200 aids a DBA or other such person to better manage the database.

DB server 30 communicatively connects to a storage device storage device 32. Generally, DB server 30 comprises a computer server capable of executing a database system. A database system, as known in the art, is a software application capable of managing, storing, and accessing data, as well as providing for the security of the data and maintaining the integrity of the data. In many cases, such database systems also provide an interface that a user may employ to interact with the database system and the data. As an example, some of the more well-known database systems that may execute on DB server 30 include DB2, IMS, Datacom, IDMS, MySQL, and Oracle.

Storage device 32 comprises a device that stores and maintains the data as one or more data objects (e.g., tables, indices, stored procedures, etc.) under the control of the database system executing on DB server 30. The data objects organize the data so that end users, such as those at user terminals 20, can store, retrieve, and otherwise manipulate the data via an interface provided by the database system executing at DB server 30. As seen in FIG. 1, the storage device 32 and the DB server 30 are shown as separate devices. While this particular architecture is possible, those of ordinary skill in the art should also appreciate that the DB server 30 and storage device 32 may, in some circumstances, comprise a single device.

In operation, application programs executing on user terminals 20 communicate request messages to DB server 30 to perform some desired data function, such as to store, retrieve, and/or manipulate specific data in storage device 32. In response to these requests, the database system at DB server 30 generates the necessary SQL queries, populates the SQL queries with any required or optional data parameters, and executes those queries to perform the desired functions and data operations. In cases where the request message is for data, the database system on DB server 30 will retrieve the desired data from storage device 32, and return that data to the requesting user terminal 20 in a response message.

Data communications between the user terminals 20, the DB server 30, and the control computer 200 are usually in the form of data packets, as in known in the art. Additionally, the database transactions that are sometimes triggered to occur by these communications, such as database accesses, for example, typically conform to a well-known protocol (e.g., such as SQL).

Most, if not all database systems, also maintain one or more transaction logs that reflect the SQL transactions occurring at the database system. For example, each time an SQL command is executed, the database system executing on DB server 30 generates and stores a corresponding transaction entry in a transaction log. Transaction entries can be different for each different SQL command, and may comprise any type of information needed or desired. However, each transaction entry conforms to a predetermined format, and typically includes information such as the actual SQL command that was executed (e.g., SELECT FROM, UPDATE, DELETE, etc.), the data objects associated with the executed SQL command (e.g., data table(s), indices, procedure name, and the like), the data parameters associated with the executed SQL command (e.g., the data to be stored, retrieved, etc.), an identifier of the application program that generated the command (and/or an identifier of a user that caused the request to be generated), and a timestamp that identifies a date and time at which the database system executed the SQL command.

Conventionally, the transaction entries in the transaction log are utilized by a "rollback" command statement to roll the data in a database back to a known state. Rollback operations may be performed, for example, if the state of the data becomes corrupted, and may be used to rollback a single SQL transaction, or to roll the entire database back to a predefined savepoint. In accordance with embodiments of the present disclosure, however, the transaction entry information in the transaction logs is analyzed to provide a user, such as a DBA, for example, with an accurate view of how the database system is actually being used, and whether that use is changing over time. Particularly, control computer 200 is configured to retrieve a defined portion of a transaction log from DB server 30, or from some other memory device, analyze the contents of the retrieved part of the transaction log, and identify patterns of command statements in the transaction log. Armed with this information, DBAs are able to better manage and optimize the database such that the performance and capacity of the database system is increased.

Figure 2:
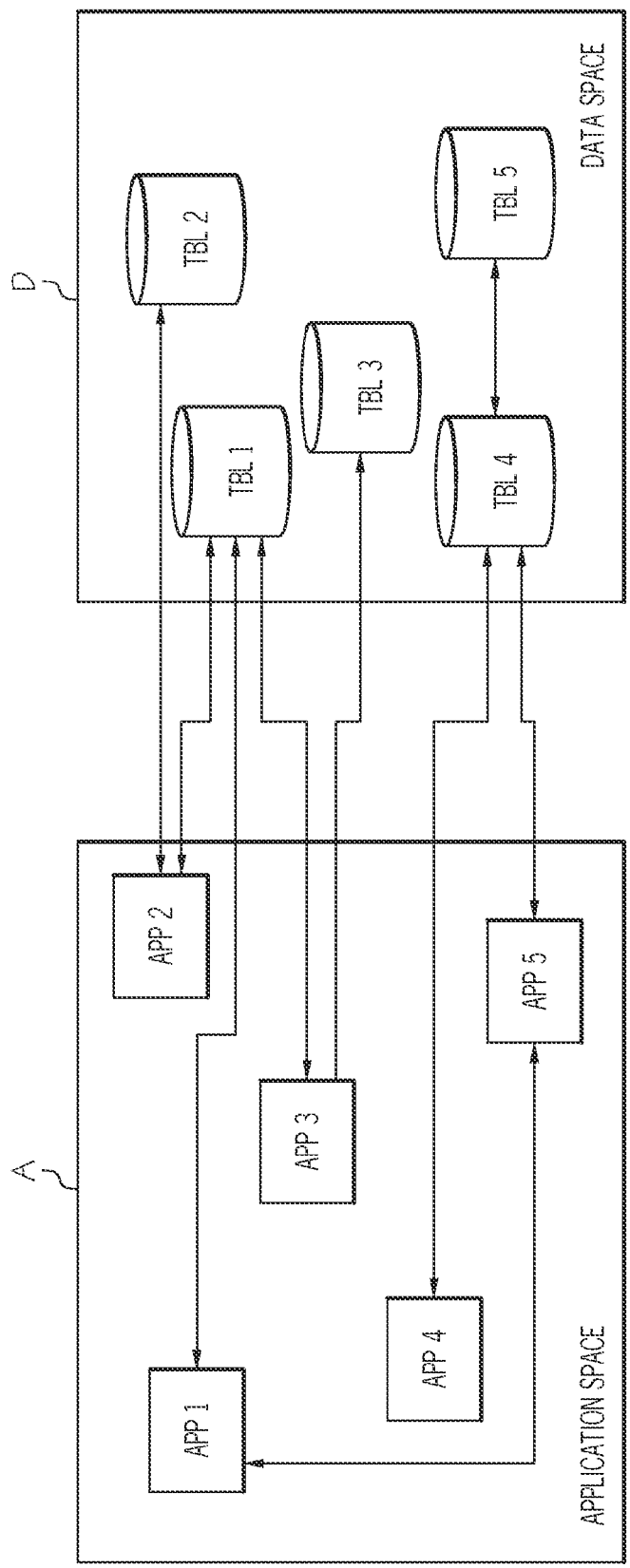
FIG. 2 is a logical block diagram illustrating multiple application programs in an application space accessing data stored in corresponding data tables of a data space.

FIG. 2 is a logical block diagram that illustrates the interaction between a plurality of application programs, which may be executing on one or more of the user terminals 20 in an application space A, and a plurality of data objects, such as data tables, in a data space D. Any given application program can access or otherwise interact with any given data table. In some cases, for example, an application program can access only a specific data table (e.g., APP 4 only accesses TBL 4), while in other cases, applications (e.g., APP 2 and APP 3) can access multiple data tables. In still other situations, application programs (e.g., APP 1) can only access certain data tables (e.g., TBL 4 and TBL 5) via another application program.

When a database is initially set up, a DBA generally creates, inter alia, the architecture of the data tables and recovery plans based on planned (or actual) usage. The DBA usually performs these functions with an eye towards optimizing the performance and capacity of the database. However, the process for performing these functions, as well as for determining when and how to perform these functions, can be complicated and time consuming. Further compounding these difficulties is the fact that the database, and its use by the end users, can be highly dynamic. Thus, the structure and content of databases tend to change over time. Therefore, the present disclosure provides a device and method that allows personnel such as a DBA to understand, inter alia, the changing usage of the database, and to leverage that knowledge to perform database management functions such as optimization and recovery planning, for example.

To accomplish this goal, embodiments of the present disclosure configure the control computer 200 to analyze the transaction entries in a transaction log, such as the transaction log 40 illustrated in FIG. 3, and based on the analysis, to identify one or more patterns P of SQL statements, such as patterns $P_1$ and $P_2$. More particularly, transaction log 40 comprises a plurality of transaction entries, each of which appears as a row in transaction log 40. Each transaction entry comprises certain information, which in this embodiment, includes an SQL query 42 that was executed, a timestamp 44 indicating when the SQL query 42 was executed, an AppID 46 identifying the particular application program at user terminal 20 that triggered the generation of the SQL query 42 (e.g., by issuing a request for data), and a UserID 48 that identifies the user logged into the application program at user terminal 20. Of course, other data may or may not be saved in the transaction log 40 as needed or desired, such as a Job ID, a database server ID, and the like.

Embodiments of the present disclosure first analyze the content of the transaction log 40 to identify transaction entries that are "related" to one another. Two or more transaction entries may be considered to be "related" if their respective command statements (e.g., SQL queries 42) form a "pattern" of commands that are executed within a predetermined timespan to perform a particular data operation. Patterns are classified as being one of an "application pattern" or a "user pattern." "Application patterns" are those that comprise a set of related transaction entries that appear frequently in the transaction log within a predefined timespan. "User patterns," as described in more detail later, are patterns made up of a recurrent series of "application patterns."

To discover such application patterns within the transaction log 40, embodiments of the present disclosure will first define a time domain or timespan over which to search for the application patterns. The time domain is generally defined to be a very small amount of time that typically covers only a subsection of the complete transaction log 40. Such time domains may be defined by a user in response to a displayed prompt, for example, or it may be predefined as a fixed or changeable parameter value. Once the timespan has been defined, the present disclosure searches the transaction log 40 within the defined timespan to locate any SQL transactions that occur in sequence. Notably, the SQL transactions need not occur contiguously to be considered as a pattern. Rather, they need only to occur in sequence within the defined timespan.

Nevertheless, any sequentially occurring SQL transactions that are located within the defined timespan are, to this point, still considered to be candidate patterns or "potential" application patterns (PAPs). That is, even though a plurality of SQL transactions may occur in sequence, it does not mean that these transactions comprise a bona fide application pattern. For example, a sequence of SQL transactions that occurs only once within the defined timespan may simply be a series of unrelated SQL transactions rather than a repeated pattern of sequentially occurring related SQL transactions. Therefore, once the PAPs have been identified, embodiments of the present invention will analyze the PAPs using additional information to determine whether any of the PAPs constitute corresponding bona fide application patterns.

There are many ways to perform the additional analysis, and in doing so, embodiments of the present disclosure may use any information needed or desired. However, in one embodiment, the present disclosure considers a number of times each PAP actually appears in the transaction log 40. For example, PAPs that appear only once in the transaction log 40 may simply be comprised of unrelated SQLs transactions that just happened to appear sequentially in the transaction log 40 within the same timespan. Thus, such PAPs may not be flagged by the present disclosure as a bona fide application pattern. At the other end of the spectrum, PAPs that appear a large number of times (e.g., 100) within the defined timespan could be flagged by the present disclosure as being a bona fide application pattern.

However, in many cases, embodiments of the present disclosure will discover one or more PAPs that appear only 2 or 3 times within the defined timespan. In these cases, a determination must be made as to whether these PAPs are bona fide application patterns, or whether they simply constitute a series of unrelated SQLs transactions that randomly occurred in the same sequence. In such cases, embodiments of the present disclosure are configured to analyze each PAP in accordance with the additional information and determine a value that indicates a probability that the PAP is a bona fide application pattern (i.e., the probability that the set of transaction commands comprising the PAP relate to the performance of a given task). The additional information used in the analysis may or may not be deterministic when determining whether a given PAP is a bona fide application pattern, but it does provide "clues" that the present disclosure may utilize to determine the level of confidence that the set of transaction commands comprising the PAP relate to the performance of a given task. Such "clues" include, but are not limited to, information such as a User ID, a name or ID of the program or application performing the SQL transactions, the names or IDs of the data objects that are accessed by the SQL statements (if any).

FIG. 3, for example, illustrates at least two exemplary application patterns—$P_1$ and $P_2$. A first application pattern $P_1$ comprises the same two SQL queries 42 (i.e., UPDATE and SELECT) that are always executed together in sequence. The second pattern, $P_2$, also comprises a set of related transaction entries having the same SQL queries 42 (i.e., DELETE, DELETE, SELECT, and INSERT) occurring in the same sequence. As seen in FIG. 3, the SQL queries 42 for both patterns $P_1$ and $P_2$ occur within a predefined time domain or timespan, which in this example, is about 1.5 seconds.

As seen in FIG. 3, neither pattern $P_1$ nor $P_2$ appear with enough frequency in the transaction log 40 such that either could be considered a bona fide application pattern. Therefore, one or both may be subjected to further analysis using the additional "clues." For example, each time the SQL queries 42 comprising pattern $P_1$ are executed, they are associated with the same Application ID 46 (i.e., PRGM1), and the same User ID 48. Further, each SQL query 42 of pattern $P_1$ accesses and performs the same operations on the same data objects (i.e., TABLE 1, TABLE 2, and COLUMN 1 and COLUMN 2 of TABLE 1). Because of these similarities, a control computer 200 performing the method of the present disclosure would identify these particular SQL queries 42 as being "related," and thus, deem these SQL queries 42 to comprise application pattern $P_1$.

The second pattern, $P_2$, also comprises a set of related transaction entries having the same SQL queries 42 (i.e., DELETE, DELETE, SELECT, and INSERT) occurring in the same sequence (but not necessarily contiguously) and accessing the same data objects (i.e., TABLE 3, TABLE 5, and TABLE 6). In this case, however, the SQL queries 42 of pattern $P_2$ are associated with different User IDs 48 and different Application IDs 46. However, because the SQL queries 42 that comprise pattern $P_2$ appear in the same sequence, access the same tables to perform the same data operations, and occur within the same predefined timespan (e.g., 1.5 seconds), embodiments of the present disclosure will identify these SQL queries 42 to be "related" and deem these SQL queries 42 to comprise application pattern $P_2$.

As seen in the transaction log 40 of FIG. 3, the particular data values for each of the SQL queries 42 in the transaction log 40 are "masked" with an 'X.' Such "masking" is done intentionally. This is because the actual data values (e.g., peoples' names, telephone numbers and addresses), are very likely be specific to a particular set of SQL transactions, and thus, will differ across SQL transactions. Such information is not particularly useful in determining patterns of related SQL queries 42. Further, by masking these data values, locating patterns of related transaction entries becomes easier and more efficient.

Additionally, as stated above, it should be noted that the present disclosure does not require the transaction entries comprising a given pattern P to occur contiguously within in the transaction log 40 to be identified as "related," or to be identified as a bona fide application pattern. One or more transaction entries that are not related to a given pattern P may be interspersed throughout the related transaction statements that comprise the pattern P without affecting the ability of the present disclosure to identify the pattern P.

For example, as seen FIG. 3, there is at least one non-related transaction entry NR (i.e., "SELECT * FROM TABLE 7) in the transaction log 40 between the transaction entries that comprise the second occurrence of pattern P2. In addition, there is also an occurrence of pattern P1 between transaction entries that comprise the second occurrence of pattern P2. With conventional data mining solutions, these interposed entries are not considered when determining whether a series of command statements comprises a pattern. Rather, conventional solutions require the transaction entries of a pattern to appear in a log file contiguously. As such, conventional mining solutions would not be able to identify the second occurrence of pattern P2. However, because embodiments of the present disclosure are time-sensitive, and because the embodiments are configured to analyze other parts of the SQL transaction statements, embodiments of the present disclosure are able identify such patterns so long as the timestamps of a given pattern's transaction entries fall within a predetermined time frame.

Figures 4, 5:
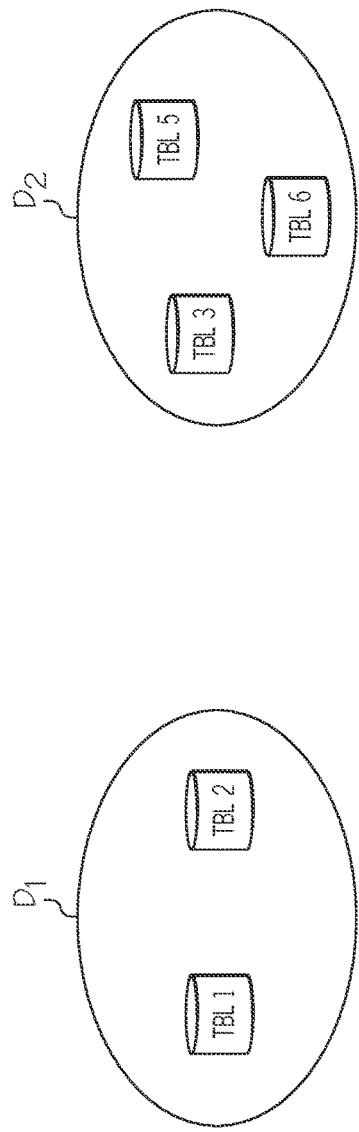
FIG. 4 is a logical block diagram illustrating data tables after having been optimized according to one embodiment of the present disclosure.
FIG. 5 illustrates a report that is output in accordance with one embodiment of the present disclosure.

Once the application patterns are identified, the embodiments of the present disclosure generate command pattern data based on the identified application patterns. For example, in some embodiments, the present disclosure may output the command pattern data in a report and/or on a display to a user, such as a DBA, for example. According to embodiments of the present disclosure, the information may then be utilized to perform various database functions such as optimize the database and implement recovery plans. By way of example, the SQL queries 42 of pattern P$_1$, as stated above, consistently access the same tables—TABLE 1 and TABLE 2—within a predefined timespan, while the SQL queries 42 of pattern P$_2$ consistently access TABLE 3, TABLE 5, and TABLE 6 within a predefined time span. As seen in FIG. 4, a DBA could, based on this information, restructure the database such that TABLE 1 and TABLE 2 are within a first dataspace D$_1$, while TABLE 3, TABLE 5, and TABLE 6 are within a second data space D$_2$. The dataspaces D$_1$, D$_2$ may, for example, be associated with different independent devices so that a failure of one device does not affect data operations with respect to the applications that interact with the tables of the dataspace on the other device. Similarly, such organization could allow a DBA to perform backup and/or recovery for the tables of one of the dataspaces D$_1$, D$_2$ without impacting data operations on the tables in the other dataspace D$_1$, D$_2$.

As previously stated, the control computer 200 could, additionally or alternatively, generate a report or graphic that displays the current organization of the dataspaces D$_1$, D$_2$, as well as one or more suggestions or recommendations for the DBA that, if implemented, could help the DBA optimize the database or achieve a desired recovery plan. Regardless of how the information and/or recommendations are presented, however, those of ordinary skill in the art will realize that the particular database structuring seen in FIG. 4 is for illustrative purposes only. Additionally, there are many different functions a DBA can perform based on the information provided by the embodiments of the present disclosure other than what is explicitly seen in the Figures.

There are also different ways in which the present disclosure can provide the command pattern data (i.e., information used for performing a database management function) to a DBA or other user. For example, as seen in FIG. 5, one embodiment generates a report 50 from the information associated with patterns P that may be displayed on a display device. Such reports may comprise any information needed or desired, but in one embodiment, report 50 is generated to comprise a pattern ID 52, which uniquely identifies a given application pattern of related SQL queries 42, the number of occurrences 54 in which the application patterns appear within the transaction log 40, and the percentage of occurrences 56 of that the application patterns appear in the transaction log 40 relative to other patterns that appear in the transaction log 40. In addition, this embodiment also provides the DBA or other user with one or more values indicating a corresponding level of confidence that the SQL queries 42 in the given pattern are actually related. As seen in FIG. 5, these values may comprise a User ID confidence value 58, a Program Name confidence value 60, and an overall confidence value 62.

As stated previously, the confidence values that are determined by in accordance with the present disclosure are based on additional "clues" or indicators. In some cases, the confidence values may be determined according to database type. Generally, the various clues or indicators depend on the type of information available in the transaction log 40. For example, transaction log 40 will usually contain some information that can be used as "basic clues" that indicate a relationship between two or more SQL queries 42. Such information will include, but is not limited to, all or part of the text comprising a given SQL query 42 that can be re-constructed by log analysis tools, and the timestamp or other time-based objects (e.g., RBA/LRSN in DB2) that indicate when an SQL query 42 was executed by control computer 200.

Other clues or indicators, however, may not be readily available from the information in the transaction log 40, but instead, may depend on the type of the database that is associated with the transaction entries in the transaction log 40. While these types of "extended" clues or indicators, which may comprise information such as the database RIs (i.e., internal RIs), may not be available from the transaction log 40, they can be generally be extracted from the database management system (e.g., from a "catalog" in DB2) using any of a variety of known methods. Such "extended" clues or indicators may comprise information such as:

Localhost—the hostname or other identifier of the computing device, such as one of the user terminals 20, executing the application program for an end user.
  User ID—the logon ID or other indicator of an end user that is accessing the database.
  Unit of Recovery (UR)/Application Program ID—the Process Identity (PID) or other unique indicator identifying which application program executing on a user terminal 20 caused the execution of the SQL queries 42.

BATCH job ID—a value that uniquely identifies which batch job (e.g., automated backup batch job, etc.), that cause the execution of the SQL queries 42.

Internal RIs—a key value in a table that is referenced by the SQL queries 42.

Stored procedures—the unique identifier of a stored procedure or subroutine that, when executed, issues the SQL queries 42.

Some or all of these "extended" clues or indicators are used in at least one embodiment to determine a confidence level that two or more SQL queries 42 in a given pattern are actually related and form the application pattern.

A DBA presented with such command pattern data in a report 50 could interpret the confidence values in different ways. For example, if a pattern is always associated with the same User ID, then the confidence level that the transaction entries are related could be very high (e.g., as seen in PATTERN 2 of FIG. 5—100%). If a pattern is always associated with a same set or group of User IDs (e.g., not simply a single User ID, but always the same group of User IDs), then the confidence level that the transaction entries are related may be lower (e.g., as seen in PATTERN 1 of FIG. 5—50%). If a pattern is associated with many uncorrelated User IDs, the confidence level that the transaction entries are related would be very low (e.g., as seen in PATTERN 3 of FIG. 5—0%). A similar analysis may be performed with respect to the identities of the application programs executing on user terminal 20. Specifically, the level of confidence that the SQL queries 42 in a given pattern are related are higher when they are associated with the same one or more application program(s) than when they are not associated with the same application program(s). Additionally, these particular confidence values may be validated by the overall confidence value 62. More specifically, embodiments of the present disclosure consider the "extended" clues or indicators in addition to the UserID 58 and PrgmID 60.

Figure 6:
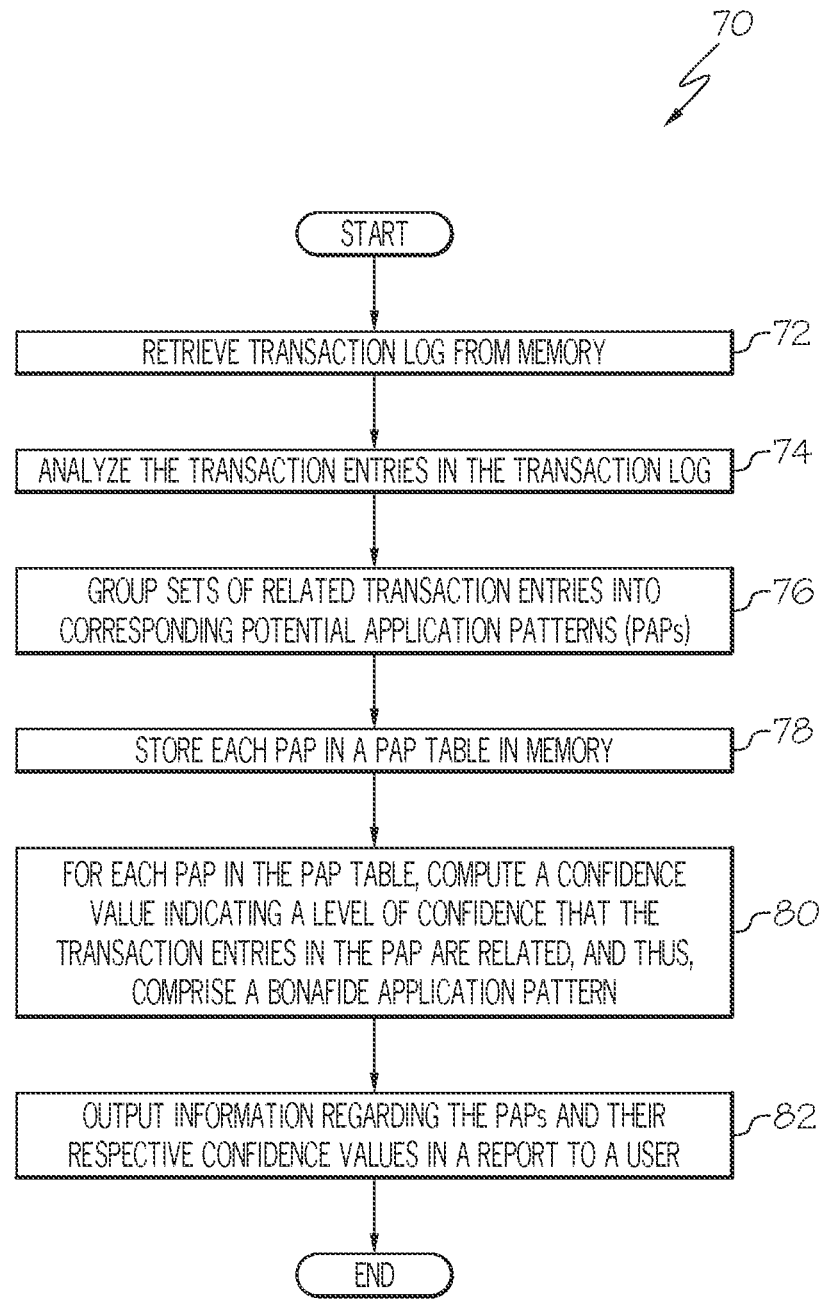
FIG. 6 is a flow diagram illustrating a method for identifying patterns of SQL queries at a computing device according to one embodiment.

FIG. 6 is a flow diagram illustrating a method 70 for identifying patterns of SQL queries 42 in a transaction log 40 according to one embodiment. Method 70 is described, as stated previously, within the context of SQL transactions. However, method 70 is not limited to such, and may be applied to identify patterns of other types of commands.

Method 70 begins with a computing device, such as control computer 200, for example, retrieving the transaction log 40 from memory (box 72). Control computer 200 may retrieve the transaction log 40 in its entirety, or for efficiencies sake, retrieve only a selected portion of transaction log 40. By way of example, control computer 200 may specify a start timestamp and an end timestamp in a request message to DB server 30. The start and end timestamps may be defined by the user, or may be a configurable value associated with a control program executed by control computer 200. In response to the request, the DB server 30 retrieves the portion of the transaction log 40 having transaction entries that fall within the specified start and end times, and sends the retrieved portion to the control computer 200. In cases where the entirety of the transaction log 40 is received at the control computer 200, control computer 200 may be configured to constrain the following analysis to the transaction entries having timestamps that fall within the defined start and end timestamps.

Once the control computer 200 receives the pertinent portion of the transaction log 40, it analyzes each of the transaction entries in the transaction log 40. As stated above, the analysis will first focus on the SQL entries 42 having timestamps that fall within a predefined timespan (e.g., 0.1 sec) that is specified, for example, by the user (box 74). Based on that analysis, the control computer 200 generates one or more candidate application patterns, referred to herein as "potential application patterns" (PAPs)—each of which represents a series of SQL queries 42 that are possibly related—i.e., a PAP (box 76). That is, each PAP represents a different potential application pattern of related transaction entries. As previously described, two or more transaction entries are considered to be "related" if their respective SQL queries 42 form a "pattern" of SQL commands that are executed to perform a particular data operation, and further, are executed within the timespan defined by the user. Each PAP is then stored in a PAP table in a memory circuit accessible to control computer 200 (box 78). Once the analysis is complete, the control computer 200 is configured to identify which of the PAPs are more likely to be bona fide application patterns. More particularly, the control computer 200 calculates one or more of the confidence values 58, 60, 62 for each PAP in the PAP table to indicate a level of confidence that the transaction entries grouped into that particular PAP are related (box 80). Control computer 200 then generates the command pattern data based on the PAPs that meet a predetermined criteria (e.g., the confidence value(s) meet or exceed a predetermined threshold). By way of example, control computer 200 may generate report 50 and/or a recommendation based on the command pattern data, and output the report 50 and/or recommendation to a display or other device for the user (box 82).

It should be well understood by those of ordinary skill in the art that the database and its data will change over time. Therefore, the method 70 of the present disclosure may be performed successively multiple times to help the DBA determine whether the usage of the database changes. Such changes may be indicated, for example, by the appearance of new patterns, changes to existing patterns (e.g., a new table is accessed), the detection of patterns that have become obsolete (e.g., a pattern that is no longer detected in an analysis), and the like. So informed, the DBA can adapt optimization and/or recovery strategies over time.

FIGS. 7A-7D illustrate a method 90 for identifying the patterns of SQL queries 42 in more detail. As above, the steps of method 90 are performed by a computing device, such as control computer 200, communicatively connected to DB server 30 via network 12.

Method 90 begins with the retrieval of transaction log 40, or at least a selected portion of transaction log 40 (box 92), as previously described. As long as the retrieved portion of transaction log 40 is not empty (box 94), control computer 200 will analyze each of the transaction entries. To analyze the transaction entries, control computer 200 first reads a transaction entry from the transaction log 40 (box 96). Then, control computer 200 will mask the data portions (e.g., the data parameters) of the SQL query 42 associated with the transaction entry (box 98).

Masking the data portions of the SQL query 42 eliminates the parts of the query that are not useful in determining whether the transaction entry is related to another transaction entry. However, it leaves the parts of the query that are useful in making this determination. For example, the useful parts of the SQL query 42 include, but are not limited to, an actual SQL command that is executed by DB server 30 (e.g., "SELECT FROM"), as well as the DB Objects (e.g., tablename, index, view, stored procedure name, etc.) that are associated with that SQL command. The remaining data portions (e.g., the values for the DB objects) are consistently masked with an alphanumeric character (e.g., an 'X'). Thus, while the particular SQL commands and the DB objects they operate on are of interest in determining whether two or more transaction entries are related, the specific user data associated with those SQL commands and DB objects is not of interest.

Once the user data values of the SQL query 42 have been masked, control computer 200 computes a hash value for the SQL query 42 using a hash function (box 100). Although any part of the SQL query 42 may be hashed, one embodiment of the present disclosure hashes the SQL command and the DB Objects associated with that command. In some cases, the alphanumeric character used to mask the data parameters (e.g., the 'X') may also be hashed. Any hash function known in the art may be used that is capable of accepting an alphanumeric string, such as SQL query 42, as input; however, regardless of the particular hashing method used, control computer 200 stores the computed hash value and the associated SQL query 42 in a query command table, with the computed hash value as the key (box 102).

As seen later in method 90, the contents of the query command table will be utilized in determining the command pattern information that is output to the user. Further, the computed hash value is utilized as a key field in several tables to allow the embodiments of the present disclosure to link related information and data across those tables.

Figure 7A:
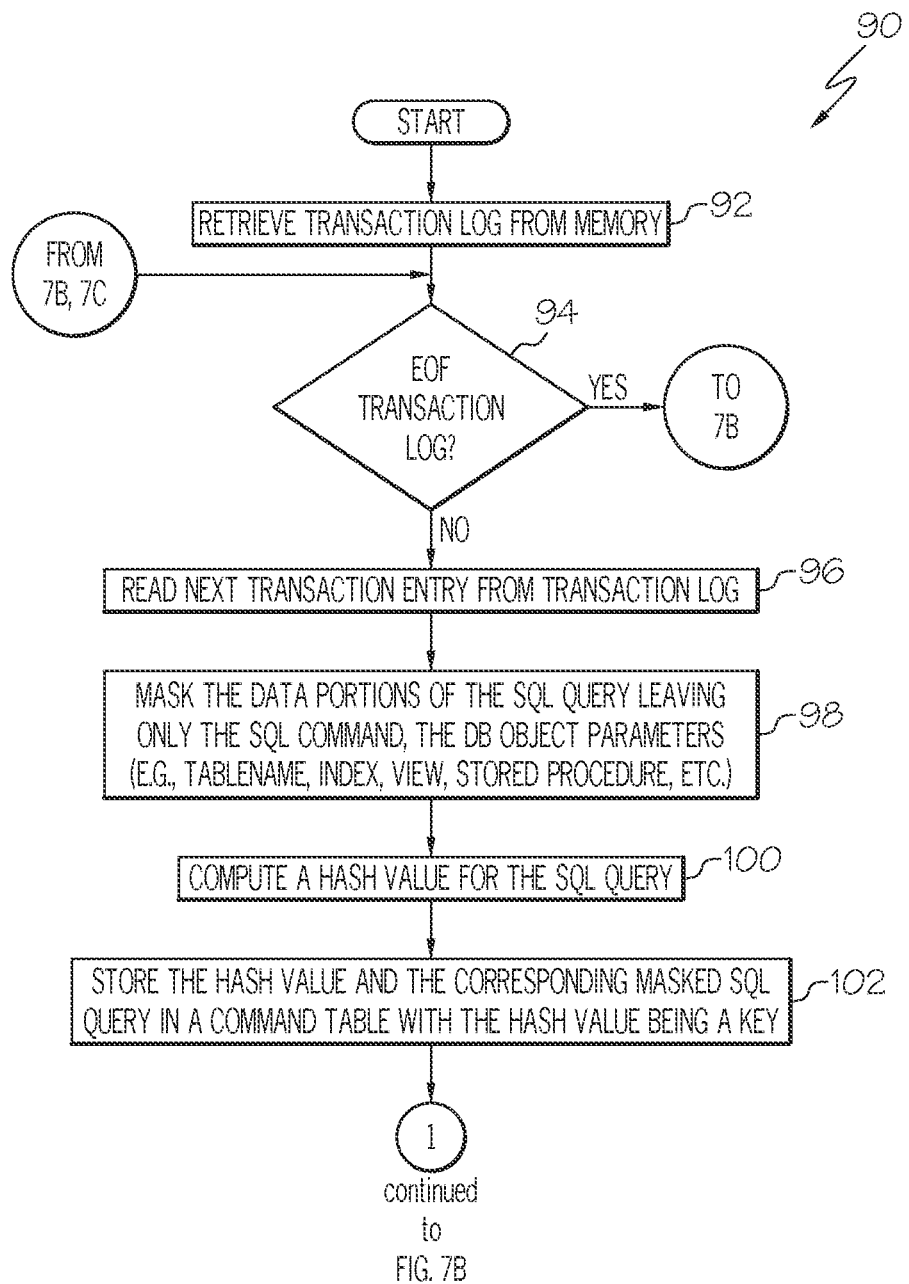
FIGS. 7A-7D are flow diagrams illustrating a method, performed at a computing device, for identifying patterns of SQL queries according to one embodiment of the present disclosure.
Figure 7B:
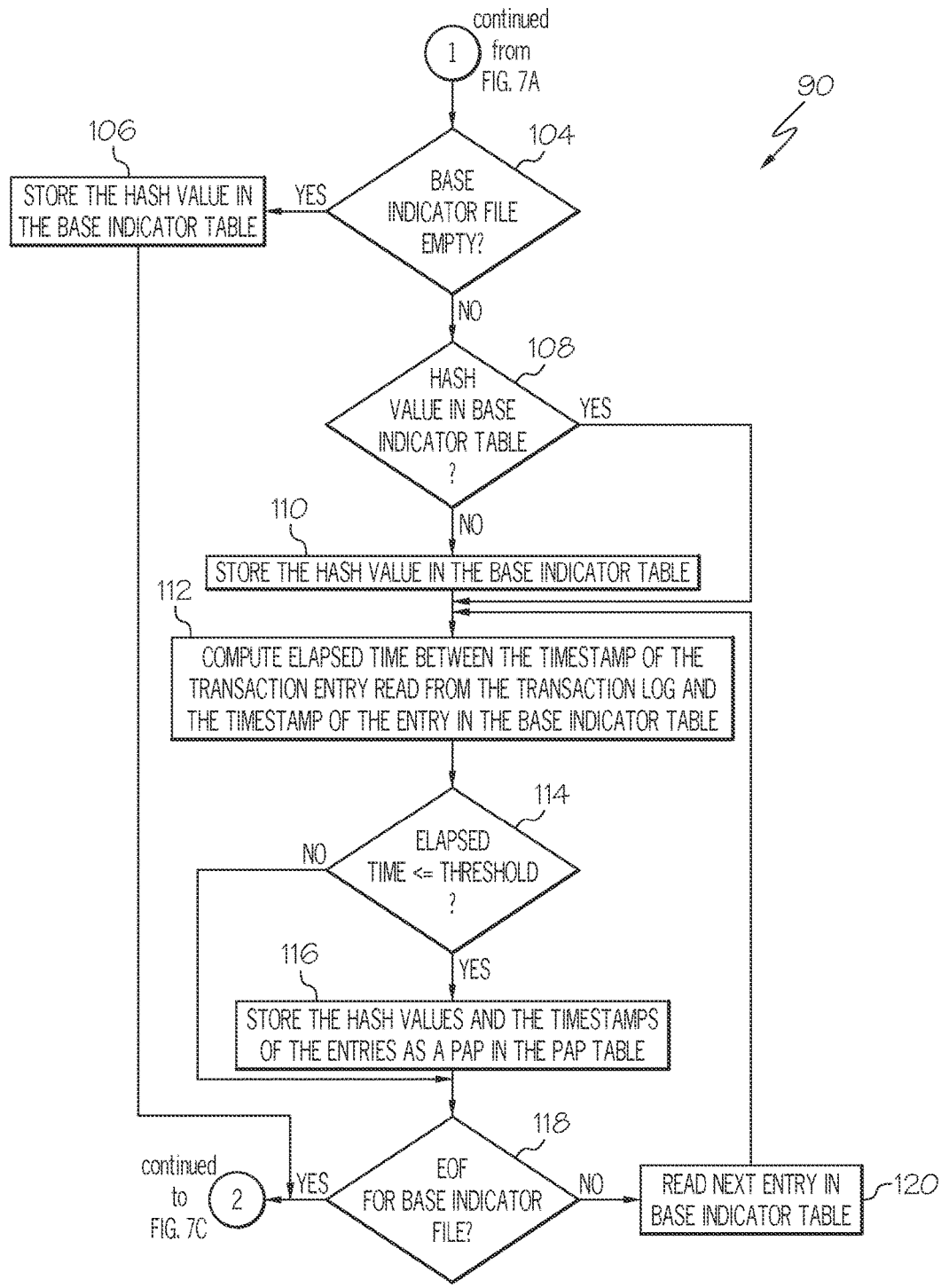
Figure 7C:
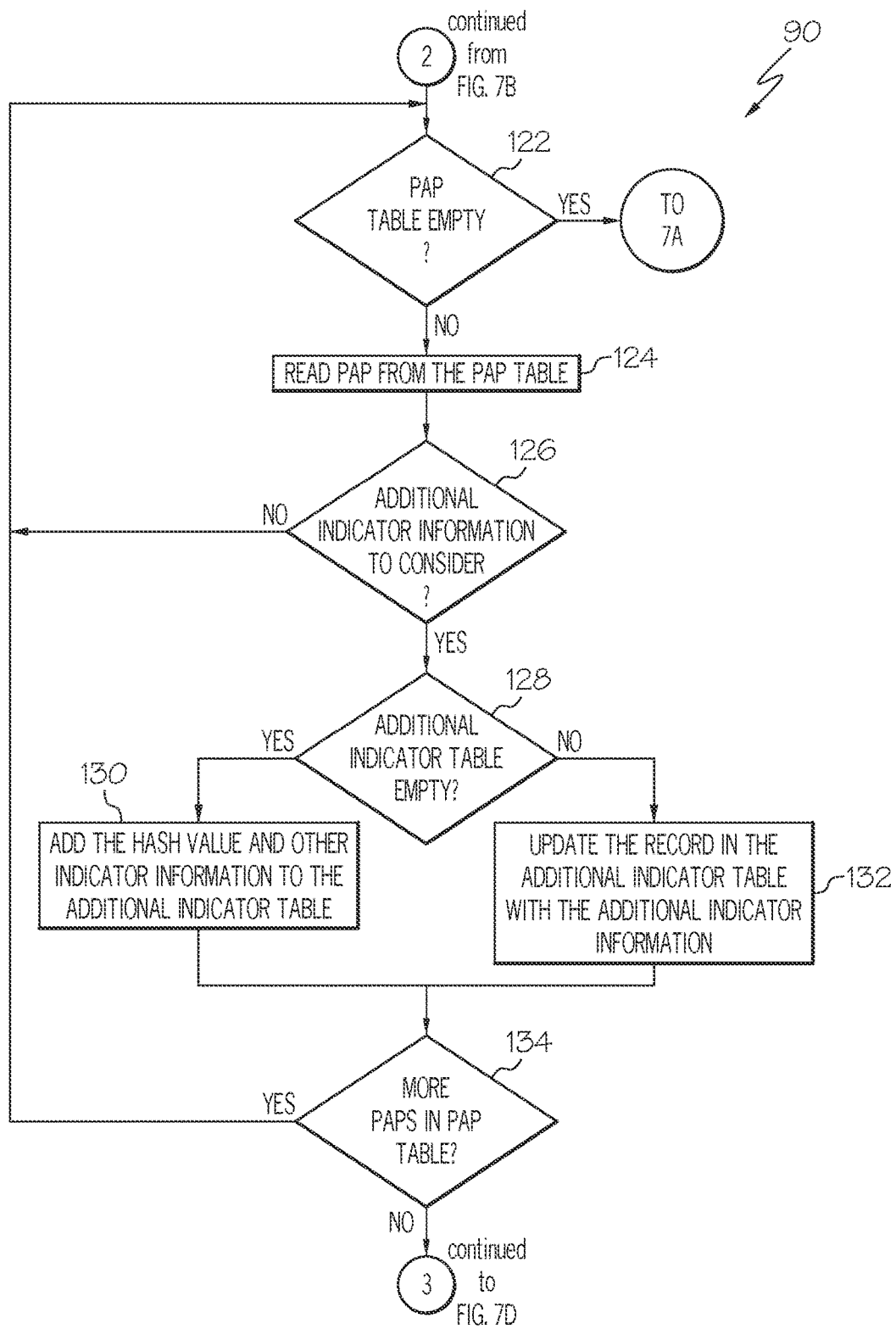

Referring now to FIGS. 7B-7C, control computer 200 then begins the process of determining whether the SQL query 42 that is associated with the most recently read transaction entry is related to any other SQL queries 42 that may have previously been read and processed. Particularly, in this embodiment, control computer 200 utilizes information that is stored in a pair of tables—a "base indicator" table (see FIG. 7B) and an "additional indicator" table (see FIG. 7C)—to accomplish this function. The base indicator table stores the data representing the times that the SQL queries 42 in the transaction log 40 were executed. The additional indicator table comprises the previously described clue information used to determine the relationship between multiple SQL queries 42 and the confidence level regarding that relationship.

As seen in FIG. 7B, control computer 200 first identifies whether any PAPs exist. More specifically, control computer first accesses the base indicator table to determine whether that table is empty, or whether it has data stored therein (box 104). If the table is empty, control computer 200 assumes that the SQL query 42 currently being processed is the first SQL query 42 read from the transaction log 40, and thus, will simply generate a new record for insertion into the base indicator table (box 106). The new record will store the hash value previously computed for the SQL query 42 currently being processed, as well as the timestamp associated with that SQL query 42. The timestamp, when inserted into the query command table, will function as a unique key into the base indicator table.

However, if the base indicator table is not empty (box 104), records of previously processed SQL queries 42 representing previously located PAPs exist. Therefore, control computer 200 will determine whether the SQL query 42 associated with the transaction entry currently being analyzed occurred subsequently to any of the existing SQL queries 42 within the timespan defined by the user, and thus, may potentially be part of an application pattern (i.e., a PAP).

To accomplish this, the control computer 200 first checks the base indicator table to determine whether the SQL query 42 already exists in that table (box 108). By way of example, the control computer 200 may check to determine whether the timestamp and computed hash value for the SQL query 42 currently being analyzed matches any of the timestamps and hash values already existing in the base indicator table. If not, control computer 200 will store the computed hash value of the SQL query 42 being analyzed in the base indicator table (box 110). Otherwise, control computer 200 will skip the insertion. This will help to reduce the chance of inserting redundant SQL queries 42 into the base indicator table.

Control computer 200 then determines whether the SQL query 42 currently being processed was executed within the predetermined timespan of another SQL query 42. Particularly, control computer 200 computes an elapsed time between the timestamp associated with the SQL query 42 being processed and the timestamp of the first SQl query 42 in the base indicator table (box 112). If the elapsed time is less than or equal to the user-defined timespan (e.g., 0.10 sec) (box 114), control computer 200 determines that the two SQL queries 42 may comprise, or at least be a part of, an application pattern. Therefore, the control computer 200 stores the hash values of both SQL queries 42 in a PAP table as potential application patterns (box 116). Control computer 200 then determines whether it has reached the end of the base indicator table (box 118). If not, control computer 200 reads the next record from the base indicator table (box 120), computes the elapsed time between the timestamp of the SQL query 42 being processed and the timestamp of the next SQL query 42 in the base indicator table (box 112), and determines, based on that elapsed time, whether those two SQL queries 42 may comprise a PAP (box 114). If so, the PAP is stored in the PAP table (box 116). This continues until the timestamp of the SQL query 42 currently being processed has been analyzed against the timestamps of each SQL query 42 represented in the base indicator table. In this manner, control computer 200 is able to compare the timestamp of each SQL query 42 read from the pertinent portion of the transaction log 40 against each of the SQL queries 42 in the base indicator table to identify which of those SQL queries 42 were executed within the predetermined timespan.

Once control computer 200 has identified each of the PAPs and stored them in the PAP table, control computer 200 gathers information that will later be utilized to determine the level of confidence that any given PAP in the PAP table is a bona fide application pattern. Specifically, as seen in FIG. 7C, control computer 200 first determines whether the PAP table is empty (box 122). If so, processing returns to begin again with reading a transaction log (see FIG. 7A). Otherwise, control computer 200 reads the hash value of the first PAP from the PAP table, and determines whether any of the SQL queries 42 comprising the PAP has additional information that may be utilized when computing a confidence level (box 124). As discussed previously, such information comprises data provided with the transaction entries associated with the SQL queries 42 and may include, but is not limited to, localhost IDs, user IDs, Application IDs, batch job IDs, internal RIs, stored procedure IDs, and the like.

If the PAP being processed has no such information (box 126), control computer 200 simply determines whether the PAP table is empty (box 122), and if not, reads the next PAP (box 124). Otherwise, control computer 200 determines whether additional indicator table is empty (box 128). If the additional indicator table is empty, or if a record identifying additional information for the PAP being processed does not exist, control computer 200 will generate a record to add to the additional indicator table (box 130). The information included in the record may include a computed hash value for the PAP, as well as the other "clues" or information previously described. Otherwise, the control computer 200 will simply update the existing record with the additional information (box 132).

The process of determining and gathering the additional clue information continues until each of the PAPs in the PAP table have been processed (box 134). Once all PAPs have been read and processed, however, control computer 200 will calculate a confidence value for each of the PAPs in the PAP table. This confidence level, as stated above, will indicate the probability that the set of transaction commands comprising the candidate command pattern are related (i.e., executed within the predefined timespan in the performance of a same task).

Figure 7D:
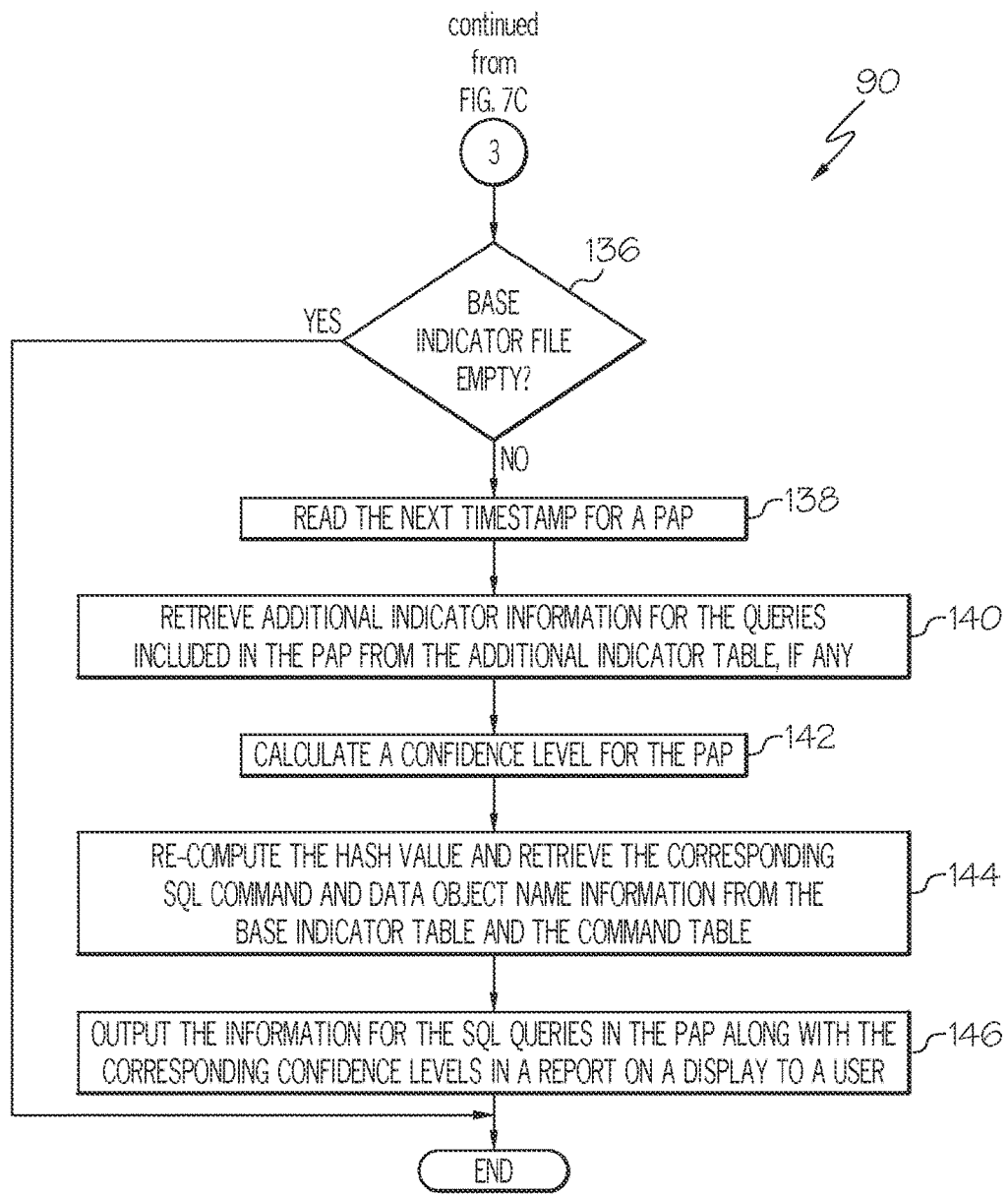

This process for determining a confidence value, according to one embodiment of the present disclosure, is illustrated in FIG. 7D. As seen in this figure, method 90 utilizes the information stored in the base indicator table and the additional indicator table to compute the confidence value, and outputs that information along with the information associated with the given pattern stored in the PAP table.

More specifically, the control computer 200 will again determine whether the base indicator table is empty (box 136). If so, the method simply ends. Otherwise, control computer 200 accesses the PAP table. Specifically, control computer 200 reads the timestamp for a first PAP represented in the PAP table (box 138), and retrieves the corresponding information for SQL queries 42 in the PAP from the additional indicator table (box 140). Then, using that information, control computer 200 determines a confidence value for the PAP as previously stated (box 142). For example, the control computer 200 may compare information associated with the SQL queries 42 that comprise the PAP, such as the DB objects that are accessed by the SQL queries 42 of the PAP, the Program ID(s) and/or User ID(s) associated with each of the SQL entries 42, and the like. Based on that comparison, control computer 200 could determine how much of the information is the same or similar. This determination can then be translated to a percentage value to convey that information to a user in report 50. For example, if the User IDs associated with one of four possibly related SQL queries 42 in a PAP, the percentage value indicating the confidence level may be 25%. If three of the four SQL queries 42 were associated with the same User ID, however, the percentage value indicating the confidence level may be 75%.

Control computer 200 then retrieves the information associated with the PAP from the command table (box 144), and generates report 50 for output to the user. Particularly, control computer 200 first re-computes the hash value using the actual SQL command and DB object information retrieved from the base indicator table and the additional indicator table, and uses that hash value to retrieve the information associated with the corresponding pattern from the command table. The information associated with the pattern, along with the corresponding confidence values, is command pattern data that may, in one embodiment, be output to a display, for example (box 146). The user, which may be a DBA, as described previously, can then utilize the command pattern data to optimize the database and/or plan for data backup and recovery.

As stated above, embodiments of the present disclosure configure a control computer 200 to locate and identify patterns of commands in a transaction log. In accordance with the present embodiments, such patterns are classified as being one of an "application pattern" or a "user pattern." "Application patterns," described above, are those that comprise a set of related transaction entries that appear frequently in the transaction log within a predefined timespan. As described above, such patterns are generally indicated by their respective transaction entries showing that the associated commands were executed within a very small time period. "User patterns," in contrast, are patterns made up of a recurrent series of "application patterns." More specifically, user patterns are patterns of commands that may not have been executed within the small time period (e.g., 0.1 sec), but comprise patterns nonetheless. That is, delays may have been introduced that prevented a computing device from executing the associated commands in rapid succession. Such delays may indicate any number of factors, such as network congestion and user delays, for example, but may prevent the present embodiments from identifying a related set of transaction entries as a bona fide pattern.

Figure 8:
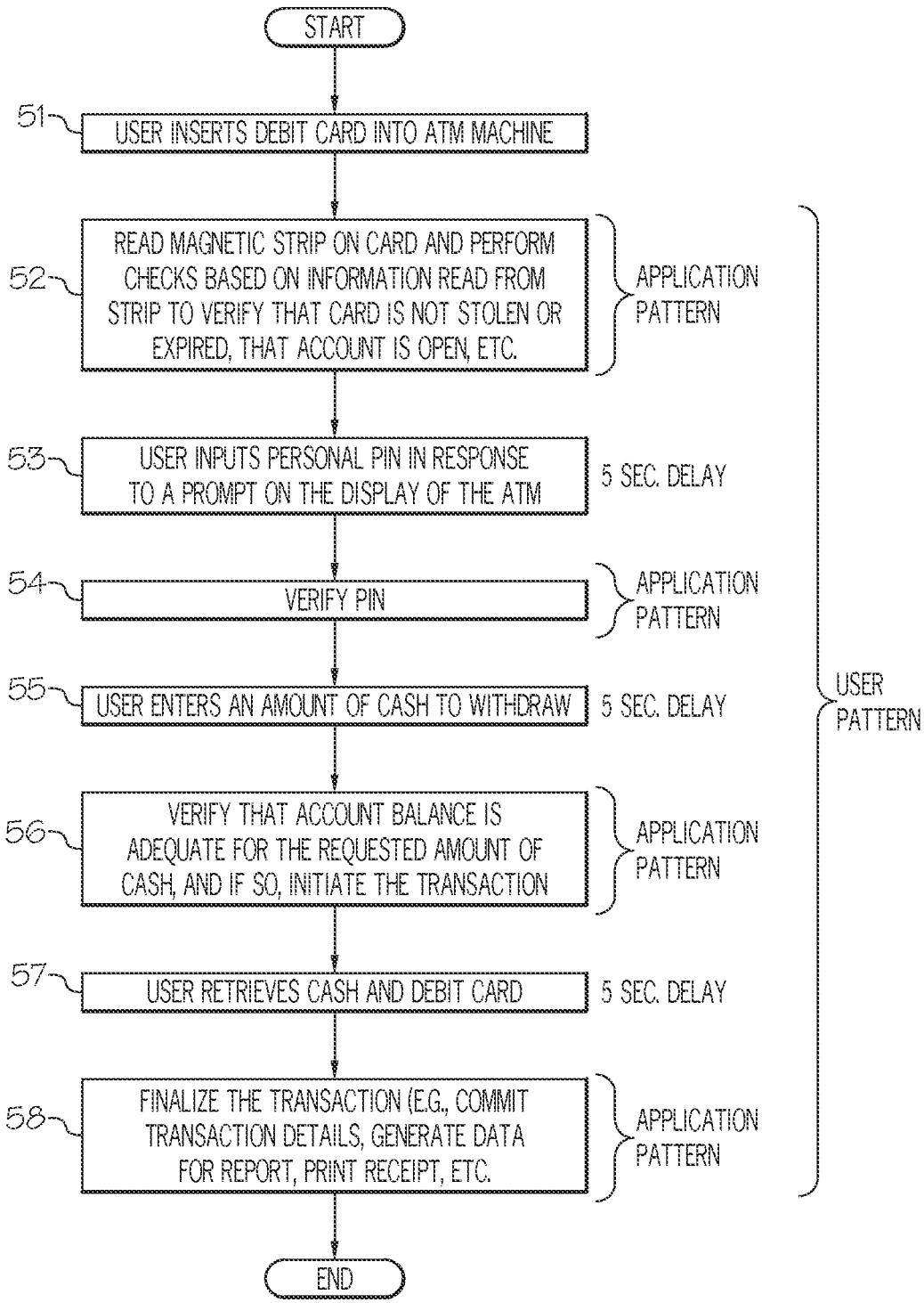
FIG. 8 is a flow diagram illustrating a scenario in which patterns of SQL entries, which may be identified according to embodiments of the present disclosure, may be generated over an extended period of time.

Consider, for example, a situation in which a user employs an Automatic Teller Machine (ATM) to withdraw cash, such as that described in FIG. 8. Broadly, to withdraw cash from an ATM, the user first inserts his/her debit card into the ATM (Step S1). The ATM then reads the magnetic strip on the user's card to obtain, inter alia, the user's account information, and executes various commands to perform the requisite verification/expiration checks on the card, that the account is open and in good standing, as well as other checks as needed or desired (Step S2). The ATM prompts the user for his/her PIN, which is provided by the user (Step S3). The ATM then executes the commands required to verify the PIN (Step S4), and if valid, the user specifies the amount of cash to withdraw (Step S5). The ATM then verifies that the balance in the user's account is adequate for the requested withdrawal, and if so, initiates and performs the transaction to provide the user with the requested amount of cash (Step S6). Once the user retrieves the cash (Step S7), the ATM will perform the actions necessary to finalize the transaction. For example, the ATM will execute the commands necessary to commit the transaction details to the database log, generate data for reports, print receipts, and the like.

Generally, the ATM machine communicates with one or more backend servers to securely provide the user with the requested cash. In cases where the server receives commands (e.g., SQL commands) from another computing device, such as the ATM or intermediary computing machine, no user interaction may be required. As such, any delays between executing related commands are negligible and confined mostly to the amount of time needed by the computing device to execute the commands. Therefore, absent congestion or some similar issue, the commands that are related to each other for performing a given function, such as those executed to perform the functions detailed in Steps S2, S4, S6, and S8, will likely occur within a very small time window (e.g., 0.1 seconds). These are the "application patterns," and the method described above provides a manner in which to identify those application patterns.

As seen in the example of FIG. 8, however, the user is presented in most cases with prompts and other similar displays to enter information (e.g., PINs, amount, account ID, etc.). The user needs time to enter the information, and the information is communicated to the server for verification and processing. For example, as seen in FIG. 8, an ATM may have to wait 5 seconds or more between the time the magnetic strip on the user's card is read and the time the user enters his/her PIN (Step S3). Similarly, the ATM may wait an additional 10 seconds after the PIN has been verified before the user enters a requested amount of cash (Step S5), and another 5 seconds before it detects that the user has retrieved the requested amount of cash and the debit card (Step S7). These specific delays are, of course, merely illustrative. Regardless, however, due to the time it takes the user to enter information, and in some cases, other factors such as network congestion, the commands associated with performing a task are not executed within the predetermined time span. Rather, the commands related to a task may be executed over a longer time span (e.g., several seconds). These patterns that occur over a longer time period are referred to herein as "user patterns," and may comprise multiple application patterns. And, although these patterns are also useful for optimizing a database and planning backup and recovery operations, the method disclosed above for locating application patterns, with its very small time span, may not be able to identify such user patterns.

Figure 9A:
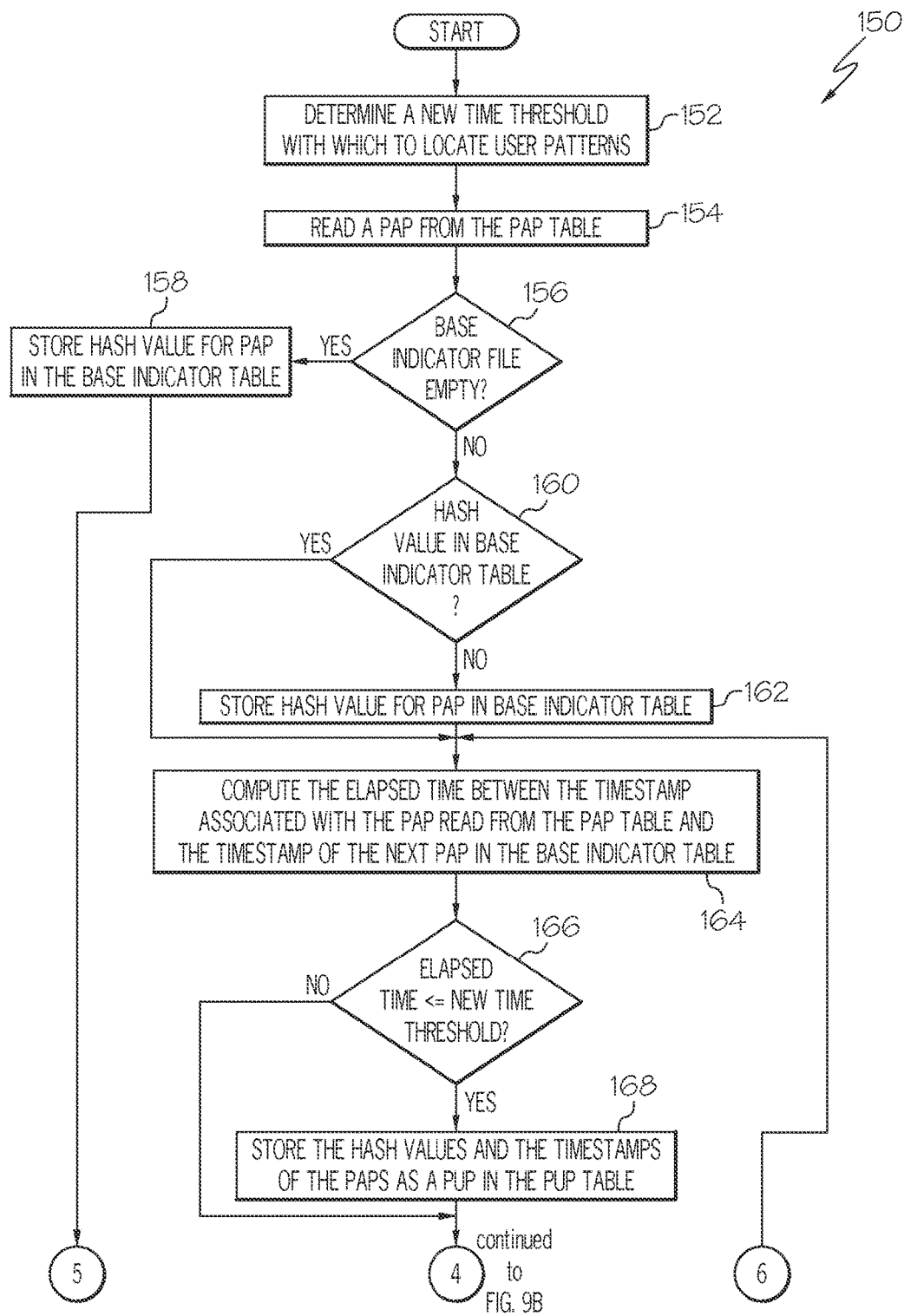
FIGS. 9A-9C are flow diagrams illustrating a method, performed at a computing device, for identifying patterns of SQL queries according to another embodiment of the present disclosure.
Figure 9B:
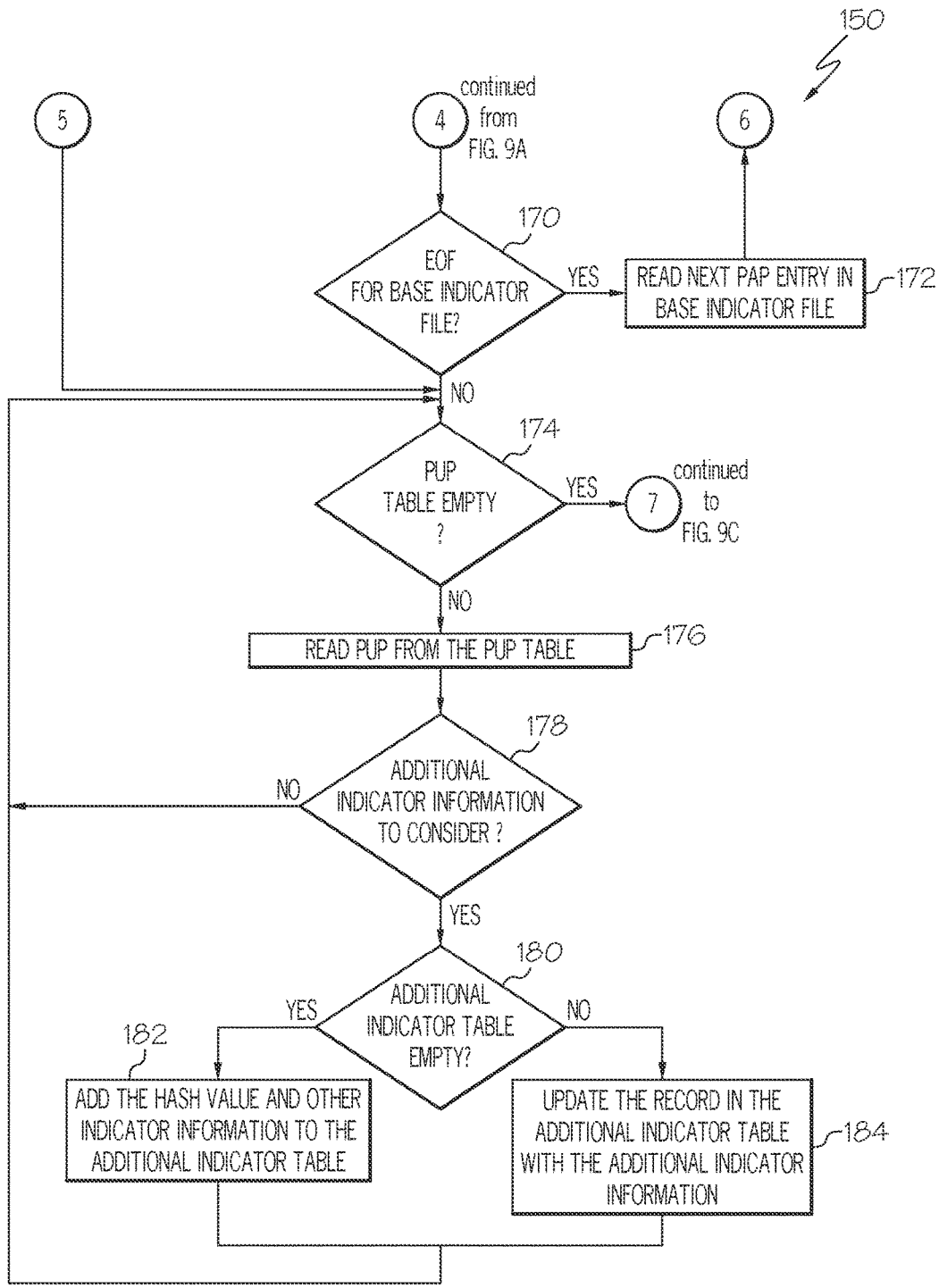
Figure 9C:
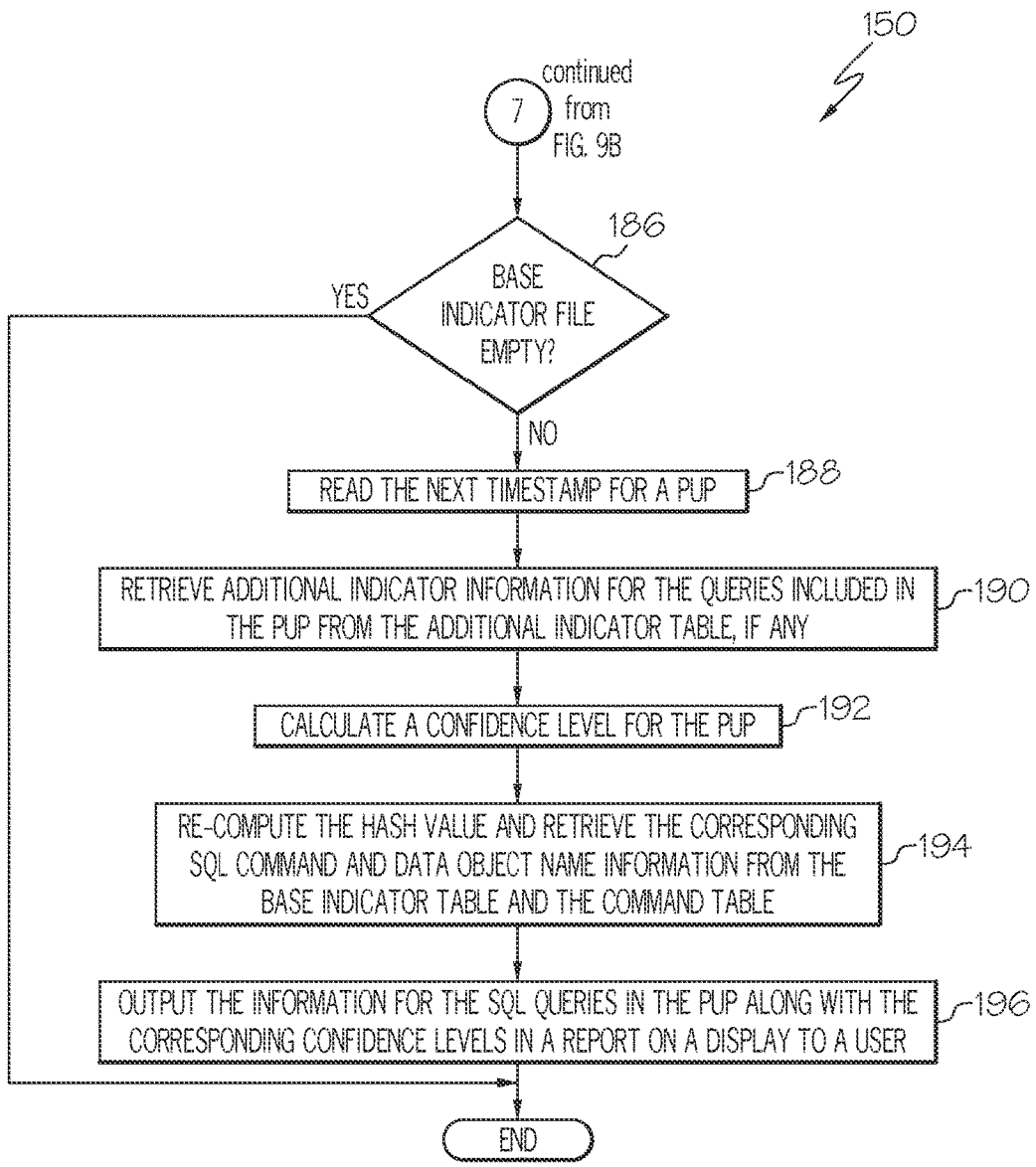

Therefore, in another embodiment of the present disclosure, the control computer 200 is configured to mine the PAPs identified in the previous method to determine whether their related commands indicate the presence of one or more "user patterns." To accomplish this, as seen in method 150 of FIGS. 9A-9C, control computer 200 analyzes the output of the method 90 above, and more specifically, the identified Potential Application Patterns (PAPs), to identify whether any of those potential patterns are bona fide user patterns occurring over a time span that exceeds the initially specified time span.

Accordingly, as seen in FIG. 9A, method 150 beings with control computer 200 determining a new time span with which to locate user patterns (box 152). For example, a user may be prompted to enter a time span, or it may be predefined and stored by control computer 200. Regardless, the new time span for locating user patterns is generally longer than the time span used to locate application patterns. Thus, if the time span used to locate application patterns is 0.1 seconds, the new time span may be, for example, 10 seconds.

Once the new time span has been determined, control computer 200 will read a PAP from the PAP table (box 154), and then perform the previously described algorithm to determine whether the newly read PAP is part of a larger user pattern. More specifically, the control computer 200 will re-use the base indicator table to process the PAPs and determine whether any of the PAPs occur as a user pattern over the new time span. The control computer 200 will also re-use the additional indicator table to further define the user patterns.

Thus, as seen in FIG. 9A, the control computer 200 will first determine whether the base indicator table is empty (box 156). If so, control computer 200 will store the hash value associated with the PAP read from the PAP table in the base indicator table (box 158). If not, control computer 200 will check to determine whether the newly read PAP is already in the base indicator table (box 160). This particular check helps to reduce the possibility of having duplicate PAP entries in the base indicator table. If the hash value for the PAP already exists in the base indicator table (box 160), control computer 200 will compute an elapsed time between the timestamp associated with the newly read PAP and the timestamp associated with a PAP in the base indicator table (box 164). Alternatively, if the hash value is not already in the base indicator table, control computer first stores the hash value for the PAP in the base indicator table (box 162) and then computes the elapsed time (box 164).

Next, control computer 200 checks to see if the computed elapsed time does not exceed the newly defined time span threshold (e.g., 10 seconds) (box 166). If so, control computer reads the next PAP from the PAP table (172) and repeats the process (boxes 164, 166, 168) until the end of table is reached (box 170). If not, control computer 200 stores the hash value and the timestamp of the PAPs in a Potential User Pattern (PUP) table (box 168), and then checks to determine whether there are more PAPs to process in the PAP table (box 170). In any case, the process is repeated (boxes 164, 166, 168) until the end of the PAP table is reached signifying that all the PAPs have been mined.

After processing according to FIG. 9A, control computer 200 has identified one or more candidate user patterns, or potential user patterns. However, as above, these patterns are considered to be only potentially related. That is, the patterns in the PUP table are related because they occur within the same newly defined time span. However, as is the case with the potential application patterns, this "time-based" factor may not be definitive. Therefore, control computer 200 is configured to further process the PUPs to determine which of those PUPs, if any, are bona fide user patterns.

Referring to FIG. 9B, control computer 200 first determines whether the PUP table is empty (box 174). If so, processing continues with FIG. 9C, which is described in more detail below. If not, control computer 200 reads a PUP from the PUP table (box 176). The control computer 200 then determines if there is any additional information to consider that would help in the determination of whether the PUP is actually a bona fide user pattern (box 178). As previously stated, such additional information may include, but is not limited to, user ID, application ID, hostname, address information, and the like. If there is no additional information to consider, control computer 200 continues with the next PUP record, if any (box 174). If there is additional information to consider, however, control computer 200 then determines whether the additional indicator table is empty (box 180). If the additional indicator table is empty, or if a record for the PUP does not exist in the additional indicator table, control computer will add the hash value and other information to the additional indicator table (box 182). If the additional indicator table is not empty and a record for the PUP already exists, control computer 184 will update the record for the PUP with the additional information (box 184). At any rate, the processing for the additional indicators continues until each of the PUPs in the PUP table has been processed.

Additionally, once the additional indicator information has been considered, control computer 200 will compute a confidence factor that indicates a probability that a given candidate user pattern (i.e., a PUP) is a bona fide user pattern. As seen in FIG. 9C, for example, control computer 200 will first determine whether the base indicator table is empty (box 186). If so, the method ends. If not, however, control computer will read the timestamp associated with the next PUP in the PUP table (box 188). Control computer 200 will then retrieve the additional indicator information for each of the SQL queries 42 included in the PUP from the additional indicator table (box 190) and then calculate a confidence level for that PUP (box 192).

Computing the confidence value for a user pattern may be accomplished as described above. Additionally, however, embodiments of the present disclosure also provide for determining the confidence value as a function of frequency in which a candidate application pattern appears in the user pattern. For example, the more times that a candidate application pattern appears within the PAPs, the higher the probability (and confidence) that the user pattern associated with that candidate application pattern is a bona fide user pattern. Additionally, or alternatively, embodiments of the present disclosure may compare the data parameters associated with the transaction commands that make up the candidate application patterns. Commands having a higher incidence of parameters that are the same or similar are more likely to be related than those having a lower incidence. Thus, a user pattern associated with commands having a higher incidence of matching data parameters will have a higher confidence value.

The control computer 200 will then re-compute the hash value of the SQL queries 42, and retrieve the corresponding SQL commands from the command table based on that re-computed has (box 194). Using this information, control computer 200 will generate command pattern data, and output that data (e.g., in a report such as report 50), indicating the SQL queries 42 for the PUP, as well as their corresponding confidence levels (box 196). As above, the report 50 may be printed or otherwise displayed to a user. However, in at least one embodiment, the report 50 is comprises information for performing a database management task for the database accessed by server 30. As above, such information may include commands (e.g., SQL commands) that are automatically generated for execution by server 30, or by some other server that is responsible for interfacing with the database for the user and/or the user applications.

Figure 10:
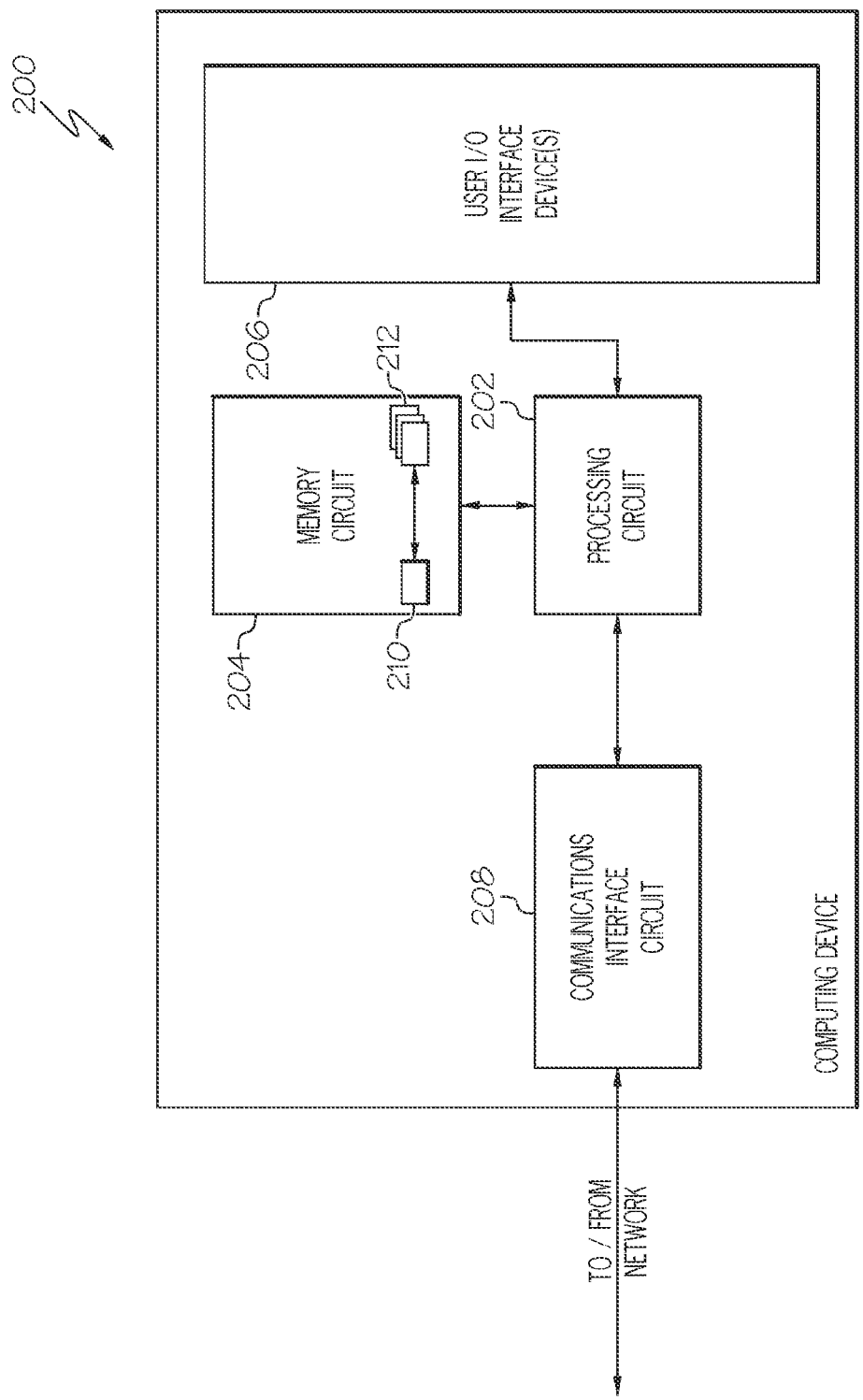
FIG. 10 is a block diagram illustrating a computer device configured to process a transaction log and define patterns of SQL queries according to one embodiment of the present disclosure.

FIG. 10 is a functional block diagram of a control computer 200 configured to perform method 90 according to one embodiment of the present disclosure. As seen in FIG. 10, control computer 200 comprises, inter alia, a processing circuit 202, a memory circuit 204, one or more user input/output (I/O) interface devices 206, and a communications interface 208.

Processing circuit 202 may be implemented by circuitry comprising one or more microprocessors, hardware, firmware, or a combination thereof. Generally, processing circuit 202 controls the operation and functions of the control computer 200 according to the appropriate standards. Such operations and functions include, but are not limited to, communicating with DB server 30 and/or one or more of the user terminals 20 via network 12, as well as the retrieval, analysis, and identification of one or more patterns of SQL queries 42, as previously described. In this regard, the processing circuit 202 may be configured to implement a control program 210 stored in memory 204 comprising the logic and instructions needed to perform the method of the present disclosure according to the embodiments as previously described.

Memory 204 may comprise any non-transitory, solid state memory or computer readable media known in the art. Suitable examples of such media include, but are not limited to, ROM, DRAM, Flash, or a device capable of reading computer-readable media, such as optical or magnetic media. Memory 204 stores programs and instructions, such as the control program 210 previously mentioned, that cause the processing circuit 202 to retrieve the transaction log 40, analyze the transaction entries in the transaction log 40, identify patterns of SQL queries 42 based on that analysis, and output that information in a generated report that may include recommendations to a user, as previously described. Memory 204 also stores one or more of the different tables 212 that are used by the processing circuit 142 to identify the patterns. Such tables include, but are not limited to, the base indicator table, the additional indicator table, the PAP table, and the PUP table, as previously described.

The user I/O interface device 206 comprises the components necessary for a user to interact with control computer 200. Such components include, but are not limited to, a display device that displays the output reports 50 previously described, and a keyboard, mouse, or other input mechanism that facilitates the user's ability to provide information related to performing the method of the present disclosure. For example, such information may comprise the identity of a database or transaction log 40, and/or timestamp information related to the retrieval and analysis of the transaction entries in transaction log 40.

The communications interface circuit 208 may comprise, for example, an I/O card or other interface circuit configured to communicate data and information with the DB server 30 and one or more of the user terminals 20 via network 12. As those of ordinary skill in the art will readily appreciate, the communications interface circuit 208 may communicate with these other entities using any known protocol needed or desired. In one embodiment, however, communications interface circuit 208 sends and receives data to and from other remote computing devices via network 12 according to the well-known ETHERNET protocol. In this regard, communications interface circuit 208 may comprise an ETHERNET card.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
    accessing, by a processing circuit, a transaction log that includes information specifying a plurality of database commands executed by a database system in response to receiving requests from a plurality of application programs;
    processing, by the processing circuit, a portion of the information included in the transaction log to derive a set of candidate patterns, wherein a given candidate pattern defines two or more database commands that occur in a sequence and are executed by the database system within a first timespan;
    based on the set of candidate patterns, the processing circuit determining a set of potential user patterns, wherein a given potential user pattern in the set of potential user patterns includes a series of candidate patterns occurring within a second timespan;
    determining, by the processing circuit, a confidence value for the given potential user pattern in the set of potential user patterns, wherein the confidence value is indicative of a probability that the given potential user pattern is a user pattern and that the series of candidate patterns for the given potential user pattern are related via a particular task associated with one of the plurality of application programs, wherein the confidence value is based on an analysis of whether candidate patterns for the given potential user pattern are associated with a common application program and a common user, and wherein determining the confidence value includes masking one or more data portions specific to the series of candidate patterns of the given potential user pattern such that the one or more data portions are not considered in determining the confidence value for the given potential user pattern; and
    generating, by the processing circuit, command pattern data based on ones in the set of potential user patterns that meet a particular criterion, wherein the command pattern data comprises information providing a particular recommendation to restructure a database accessed by the database system.

2. The method of claim 1, wherein the first timespan is a shorter timespan than the second timespan.

3. The method of claim 1, wherein determining the given potential user pattern comprises:
    computing an elapsed time between a timestamp associated with a first candidate pattern in the set of candidate patterns and a timestamp associated with a second candidate pattern in the set of candidate patterns; and
    combining the first and second candidate patterns to form the given potential user pattern if the elapsed time is less than or equal to the second timespan.

4. The method of claim 1, wherein determining the confidence value for the given potential user pattern comprises determining the confidence value as a function of frequency in which a candidate pattern associated with the given potential user pattern is in the set of candidate patterns.

5. The method of claim 1, wherein each one in the series of candidate patterns included in the given potential user pattern is associated with a subtask of the particular task.

6. The method of claim 1, wherein generating command pattern data based on ones in the set of potential user patterns that meet the particular criterion comprises outputting a report comprising the command pattern data for a potential user pattern if the confidence value of the potential user pattern is equal to or exceeds a predetermined confidence threshold.

7. The method of claim 1, wherein the confidence value is further based on whether candidate patterns for the given potential user pattern are associated with common database tables operated on as a result of execution of database commands in those candidate patterns.

8. The method of claim 1, wherein the given potential user pattern includes a delay between execution of two candidate patterns in the series of candidate patterns for the given potential user pattern, wherein the delay is based on a particular user's interaction with an application program.

9. The method of claim 1, wherein a particular one of the set of candidate patterns includes two or more database commands that do not occur contiguous in the sequence of that particular candidate pattern.

10. The method of claim 1, wherein the particular recommendation to restructure the database includes restructuring the database such that database tables that are accessed for a given user pattern are maintained in the same dataspace.

11. The method of claim 10, wherein at least two of the database tables are each associated with a different respective computing device, and wherein restructuring the database includes moving one or more of the database tables such that the database tables are associated with the same computing device.

12. A computing device comprising:
    a processing circuit; and
    a memory circuit having program instructions stored thereon that are executable by the processing circuit to cause the computing device to perform operations comprising:
        obtaining, from a database system, a portion of a transaction log that includes information identifying a set of database commands executed by the database system in response to receiving requests from a set of application programs;
        determining, based on the obtained portion of the transaction log, a set of candidate patterns that respectively define at least two database commands that occur in sequence and are executed by the database system within a first timespan;
        determining, based on the set of candidate patterns, a set of potential user patterns, wherein each potential user pattern includes a series of candidate patterns that occur within a second timespan;
        determining a confidence value for each potential user pattern in the set of potential user patterns, wherein the confidence value for an individual potential user pattern is indicative of a probability that the individual potential user pattern is a user pattern and that ones in the series of candidate patterns included in the individual potential user pattern are related via a particular task performed in relation to one of the set of application programs, and wherein the confidence value for the individual potential user pattern is based on an analysis of whether candidate patterns for that individual potential user pattern are associated with a common application program and a common user, and wherein determining the confidence value includes masking one or more data portions specific to the series of candidate patterns of the individual potential user pattern such that the one or more data portions are not considered in determining the confidence value for the individual potential user pattern; and generating command pattern data based on potential user patterns in the set of potential user patterns that meet a particular criterion, wherein the command pattern data comprises information providing a particular recommendation to restructure a database accessed by the database system.

13. The computing device of claim 12, wherein the first timespan is a shorter timespan than the second timespan.

14. The computing device of claim 12, wherein the operations further comprise:

computing an elapsed time between a timestamp associated with a first candidate pattern in the set of candidate patterns and a timestamp associated with a second candidate pattern in the set of candidate patterns; and combining the first and second candidate patterns to form the individual potential user pattern if the elapsed time is less than or equal to the second timespan.

15. The computing device of claim 12, wherein the operations further comprise:

determining the confidence value for the individual potential user pattern based on a number of times a particular candidate pattern associated with the individual potential user pattern is in the set of candidate patterns.

16. The computing device of claim 12, wherein each candidate pattern in the series of candidate patterns included in the individual potential user pattern is associated with a subtask of the particular task.

17. The computing device of claim 12, wherein a given potential user pattern in the set of potential user patterns is determined to meet the particular criterion if the confidence value for that given potential user pattern is equal to or exceeds a particular confidence threshold.

18. A non-transitory computer-readable storage medium having program instructions stored thereon that, when executed by a processing circuit of a computing device, cause the computing device to perform operations comprising:

accessing, from a transaction log maintained by a database system, a plurality of database commands executed by the database system in response to receiving requests from a user device;

determining a set of patterns based on the plurality of database commands, wherein a given one in the set of patterns comprises at least two of the plurality of database commands that occur in sequence and are executed by the database system within a first timespan;

determining, based on the set of patterns, a set of potential user patterns, wherein a particular one in the set of potential user patterns comprises a series of patterns that occur within a second predetermined timespan;

determining a confidence value for the particular potential user pattern, wherein the confidence value is indicative of a probability that the particular potential user pattern is a user pattern and that ones in the series of patterns for the particular potential user pattern are related to a particular task associated with the a user's interaction with the user device; and wherein the confidence value is based on an analysis of whether patterns for that particular potential user pattern are associated with a common application program and a common user, and wherein determining the confidence value includes masking one or more data portions specific to the series of patterns of the particular potential user pattern such that the one or more data portions are not considered in determining the confidence value for the particular potential user pattern; and generating command pattern data based on potential user patterns in the set of potential user patterns that meet a particular criterion, wherein the command pattern data comprises information providing a particular recommendation to restructure one or more databases accessed by the database system.

* * * * *